(12) United States Patent
Menayan

(10) Patent No.: US 6,263,940 B1
(45) Date of Patent: Jul. 24, 2001

(54) IN-LINE CONTINUOUS FEED SLEEVE LABELING MACHINE AND METHOD

(75) Inventor: Victor V. Menayan, Cary, NC (US)

(73) Assignee: Axon Corporation, Garner, NC (US)

( * ) Notice: Subject to any disclaimer, the term of this patent is extended or adjusted under 35 U.S.C. 154(b) by 0 days.

(21) Appl. No.: 09/295,549

(22) Filed: Apr. 21, 1999

(51) Int. Cl.[7] .............................. B65B 5/00; B65B 53/00; B65B 11/06
(52) U.S. Cl. ...................... 156/556; 156/566; 156/540; 156/86; 53/399; 53/585
(58) Field of Search ............................... 156/86, 540, 543, 156/556, 566, 567, 568; 53/399, 441, 556, 585

(56) References Cited

U.S. PATENT DOCUMENTS

| | | |
|---|---|---|
| 2,149,377 | 3/1939 | Winslow . |
| 3,652,369 | 3/1972 | Della Vite .............................. 156/566 |
| 3,850,774 | 11/1974 | Schonig et al. ....................... 156/455 |
| 3,924,387 | 12/1975 | Konstantin .............................. 53/291 |
| 3,959,065 | 5/1976 | Ashcroft ................................ 156/423 |
| 3,988,182 | 10/1976 | Urso et al. .............................. 156/60 |
| 4,108,710 | 8/1978 | Hoffmann ............................. 156/450 |
| 4,114,774 | 9/1978 | Scheidegger ......................... 215/250 |
| 4,163,686 | 8/1979 | Risi ....................................... 156/492 |
| 4,171,736 | 10/1979 | Scheidegger ............................ 193/38 |
| 4,177,546 | 12/1979 | Geisinger ................................ 29/235 |
| 4,188,249 | 2/1980 | Fujio ..................................... 156/165 |
| 4,201,029 | 5/1980 | Lerner et al. ........................... 53/429 |
| 4,201,621 | 5/1980 | Crankshaw et al. .................. 156/567 |
| 4,202,153 | 5/1980 | Lerner et al. ........................... 53/459 |
| 4,231,479 | 11/1980 | Scheidegger ......................... 215/250 |
| 4,245,452 | 1/1981 | Fujio ..................................... 53/399 |
| 4,247,357 | 1/1981 | Kontz .................................... 156/567 |
| 4,250,686 | 2/1981 | Fujio ..................................... 53/296 |
| 4,286,421 | 9/1981 | Fujio ..................................... 53/399 |
| 4,287,700 | 9/1981 | Fujio ..................................... 53/292 |
| 4,288,967 | 9/1981 | Seko et al. .............................. 53/550 |
| 4,288,968 | 9/1981 | Seko et al. .............................. 53/550 |
| 4,290,992 | 9/1981 | Fujio ..................................... 264/163 |
| 4,293,364 | 10/1981 | Fujio ..................................... 156/344 |
| 4,323,416 | 4/1982 | Malthouse et al. ................... 156/521 |
| 4,387,553 | 6/1983 | Strub et al. ............................. 53/585 |
| 4,398,380 | 8/1983 | Takamura ............................... 53/390 |

(List continued on next page.)

*Primary Examiner*—Richard Crispino
*Assistant Examiner*—Sue A. Purvis
(74) *Attorney, Agent, or Firm*—Cislo & Thomas, LLP

(57) ABSTRACT

An in-line continuous feed sleeve labeling machine labels containers, such as beverage containers, in an in-line fashion maintaining the elevation of the containers during their linear transport. The in-line continuous feed sleeve labeling machine of the present invention receives bottles in flood feeder or linear fashion. A timing screw or the like properly separates, and both spatially and temporally disposes, the containers for sleeving. The timing screw propels the containers onto a pedestal system. The pedestals of the pedestal system maintain their horizontal nature due to offset pivotable attachments to the track system upon which they travel. In coordinated fashion with the travel of the pedestal system, iris carriers carrying sleeves upon articulating radial arms descend upon the bottles. Once the label sleeve has reached the appropriate point (generally adjacent to the central portion of the bottle), the iris carrier allows the label sleeve to engage the central portion of the bottle. Frictional attachment or otherwise allows the finger rods of the iris carrier to pull away from the sleeve as the iris carrier continues to descend down towards the pedestal. The sleeve then becomes attached to or engaged by the bottle until the finger rods of the iris carrier free themselves from the sleeve label. A container stabilizer may provide lateral bottle support and aid the ensleevement process. The finger rods then dilate to better disengage the bottle as the iris carrier ascends up and away from the bottle. The bottle is then transported to an exit conveyor having been properly sleeved, while the iris carrier returns to transport another sleeve.

3 Claims, 26 Drawing Sheets

U.S. PATENT DOCUMENTS

| | | | |
|---|---|---|---|
| 4,401,020 | 8/1983 | Brux | 100/7 |
| 4,412,876 | 11/1983 | Lerner et al. | 156/64 |
| 4,445,310 | 5/1984 | Scheidegger | 53/485 |
| 4,447,280 * | 5/1984 | Malthouse | 156/85 |
| 4,470,241 | 9/1984 | Parry et al. | 53/556 |
| 4,480,984 | 11/1984 | DiFrank et al. | 425/508 |
| 4,487,650 | 12/1984 | Mohn et al. | 156/567 |
| 4,497,156 | 2/1985 | Scheidegger | 53/399 |
| 4,519,186 | 5/1985 | Winter et al. | 53/585 |
| 4,545,174 | 10/1985 | Seko | 53/51 |
| 4,570,415 | 2/1986 | Centeno | 53/399 |
| 4,595,544 | 6/1986 | Maruyama et al. | 264/46.5 |
| 4,601,155 | 7/1986 | Lewis | 53/176 |
| 4,612,313 | 9/1986 | Leinert et al. | 514/255 |
| 4,620,888 | 11/1986 | Easter et al. | 156/64 |
| 4,660,357 | 4/1987 | Fresnel | 53/585 |
| 4,691,499 | 9/1987 | Umeda et al. | 53/451 |
| 4,691,835 | 9/1987 | Mueller | 215/246 |
| 4,694,633 | 9/1987 | Fujio et al. | 53/49 |
| 4,724,036 | 2/1988 | Hill et al. | 156/497 |
| 4,726,168 | 2/1988 | Seko | 53/450 |
| 4,729,811 | 3/1988 | DiFrank | 156/449 |
| 4,731,976 | 3/1988 | Nye | 53/399 |
| 4,739,605 | 4/1988 | Takamura | 53/399 |
| 4,765,121 | 8/1988 | Konstantin et al. | 53/442 |
| 4,775,088 | 10/1988 | Seko | 226/172 |
| 4,801,348 | 1/1989 | Takagaki | 156/456 |
| 4,803,829 | 2/1989 | Scheidegger | 53/442 |
| 4,806,187 | 2/1989 | Fujisawa | 156/86 |
| 4,823,538 | 4/1989 | Takamura | 53/512 |
| 4,832,774 | 5/1989 | DiFrank et al. | 156/215 |
| 4,910,941 | 3/1990 | Nagano et al. | 53/291 |
| 4,944,825 | 7/1990 | Gifford et al. | 156/294 |
| 4,947,622 | 8/1990 | Danforth et al. | 53/487 |
| 4,947,627 | 8/1990 | Scheidegger | 53/557 |
| 4,964,258 | 10/1990 | Seko et al. | 53/75 |
| 4,977,002 | 12/1990 | Hoffman | 428/34.7 |
| 4,994,135 | 2/1991 | Orlandi | 156/362 |
| 5,006,196 | 4/1991 | Vandevoorde | 156/494 |
| 5,028,293 | 7/1991 | Harvey | 156/449 |
| 5,043,130 | 8/1991 | Fujio | 264/509 |
| 5,060,367 | 10/1991 | Vandevoorde | 29/775 |
| 5,070,680 | 12/1991 | Nagano | 53/557 |
| 5,079,902 | 1/1992 | Seko et al. | 53/450 |
| 5,120,392 | 6/1992 | Butkevich et al. | 156/566 |
| 5,174,095 | 12/1992 | Fujiwara et al. | 53/480 |
| 5,192,392 | 3/1993 | Peterson et al. | 156/566 |
| 5,197,259 | 3/1993 | Menayan | 53/399 |
| 5,326,422 | 7/1994 | Kronseder | 156/566 |
| 5,385,002 | 1/1995 | Cundall | 53/441 |
| 5,398,395 | 3/1995 | Woolls | 29/417 |
| 5,412,859 | 5/1995 | Hubbs et al. | 29/450 |
| 5,417,794 | 5/1995 | Menayan | 156/362 |
| 5,421,932 | 6/1995 | Fujio | 156/192 |
| 5,433,057 | 7/1995 | Lerner et al. | 53/399 |
| 5,448,876 | 9/1995 | Menayan | 53/399 |
| 5,477,956 | 12/1995 | Liebhart | 198/459.4 |
| 5,478,422 | 12/1995 | Bright et al. | 156/64 |
| 5,483,783 | 1/1996 | Lerner et al. | 53/399 |
| 5,524,420 | 6/1996 | Ikuta | 53/450 |
| 5,565,057 | 10/1996 | Owens | 156/304.1 |
| 5,588,278 | 12/1996 | Wynn et al. | 53/399 |
| 5,613,345 | 3/1997 | Saito et al. | 53/266.1 |
| 5,665,443 | 9/1997 | Hata et al. | 428/34.9 |
| 5,711,135 | 1/1998 | Menayan | 53/399 |
| 5,715,651 | 2/1998 | Thebault | 53/399 |
| 5,725,966 | 3/1998 | Abe et al. | 429/167 |
| 5,737,900 | 4/1998 | Konstantin et al. | 53/295 |
| 5,759,337 | 6/1998 | Fujio et al. | 156/443 |
| 5,775,063 | 7/1998 | Ikai et al. | 53/463 |
| 5,797,247 | 8/1998 | Nakagoshi et al. | 53/442 |

* cited by examiner

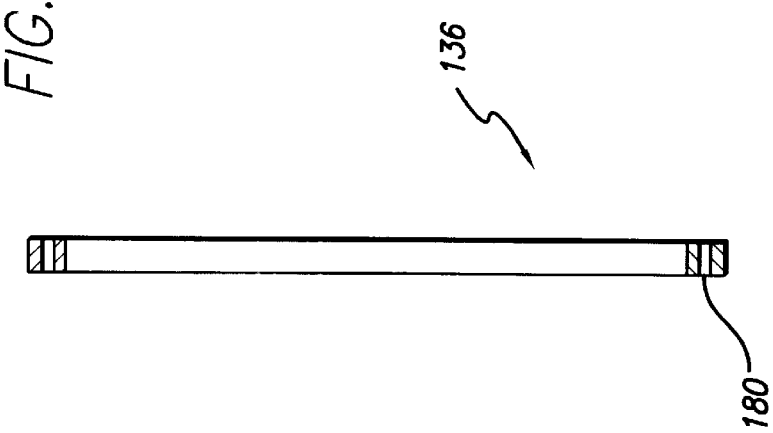
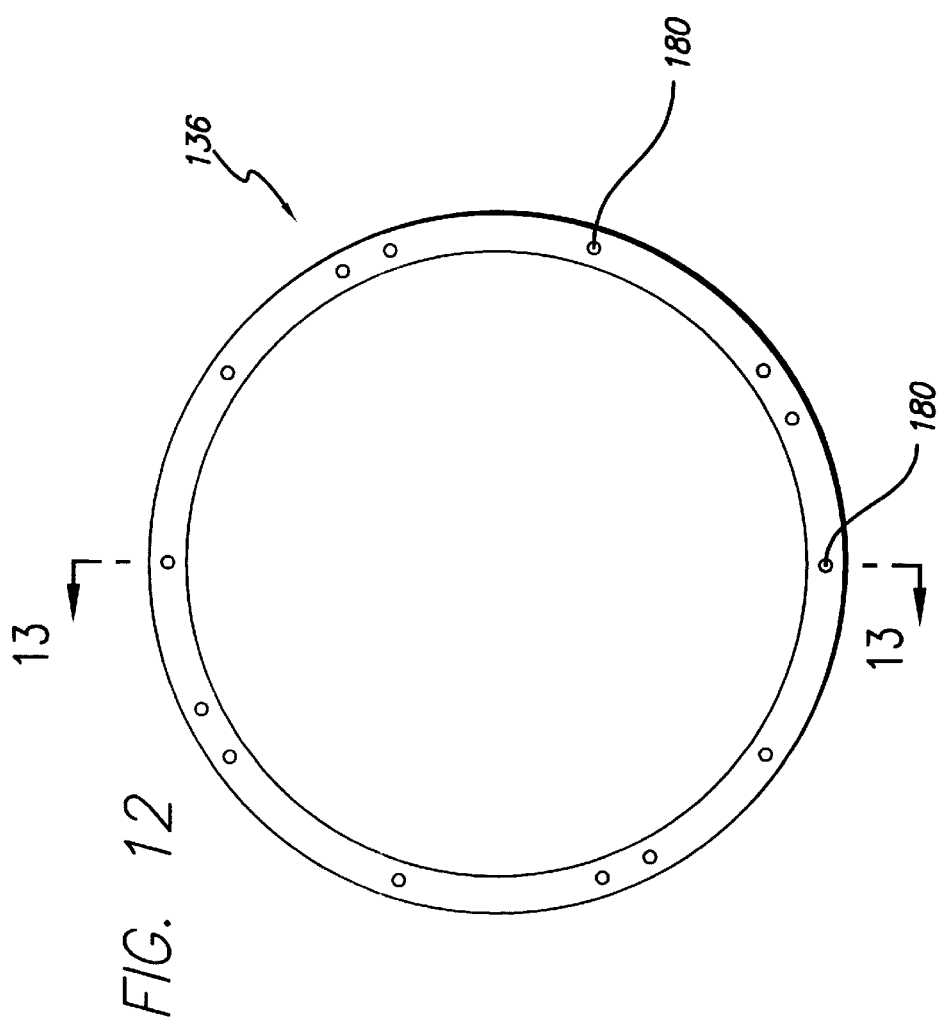

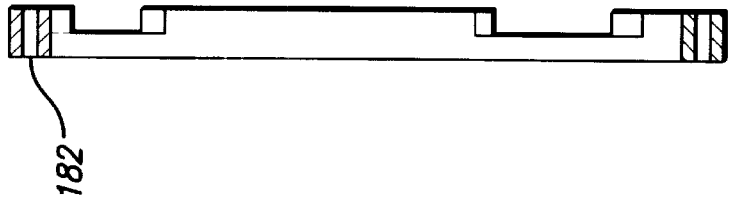
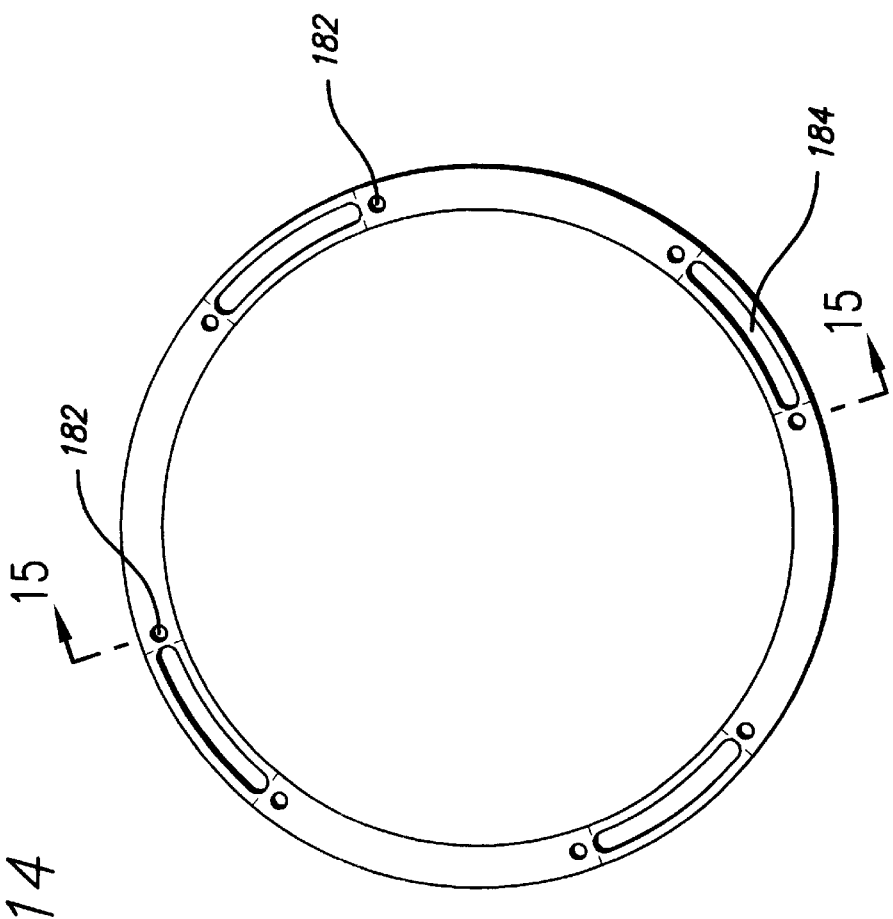

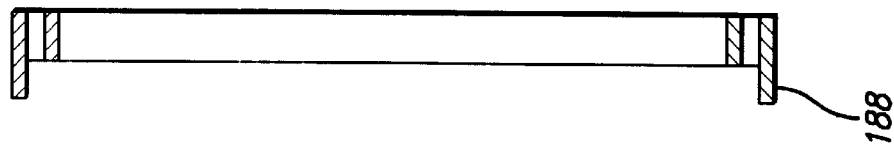
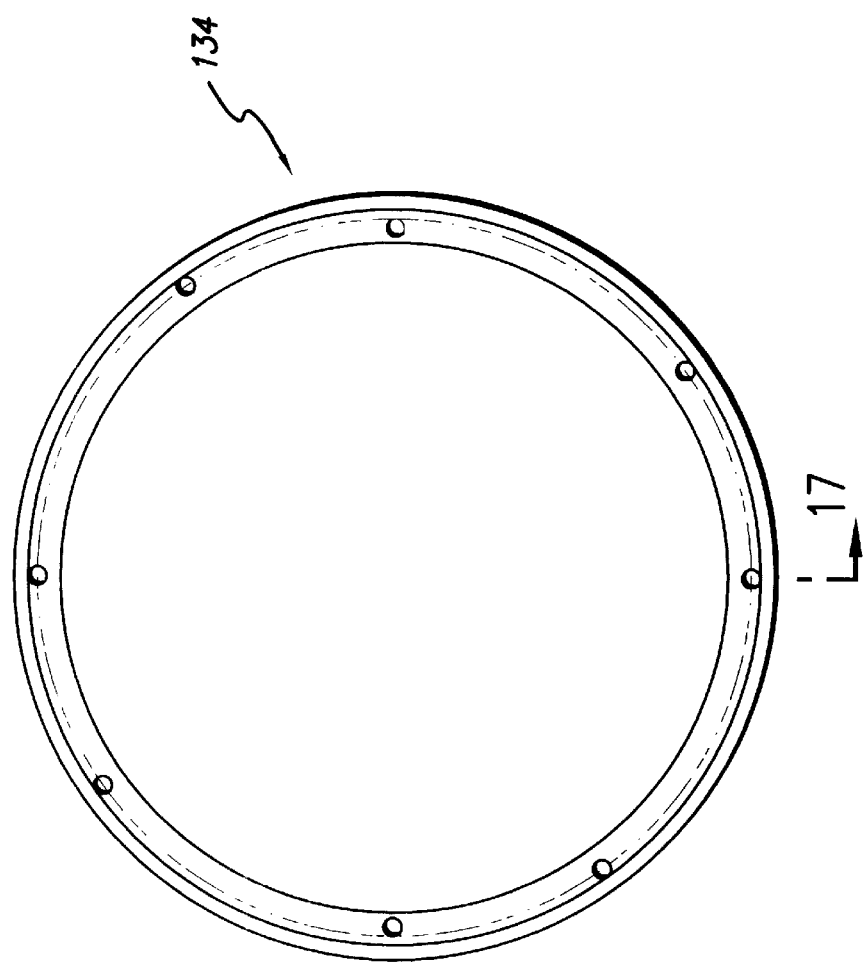

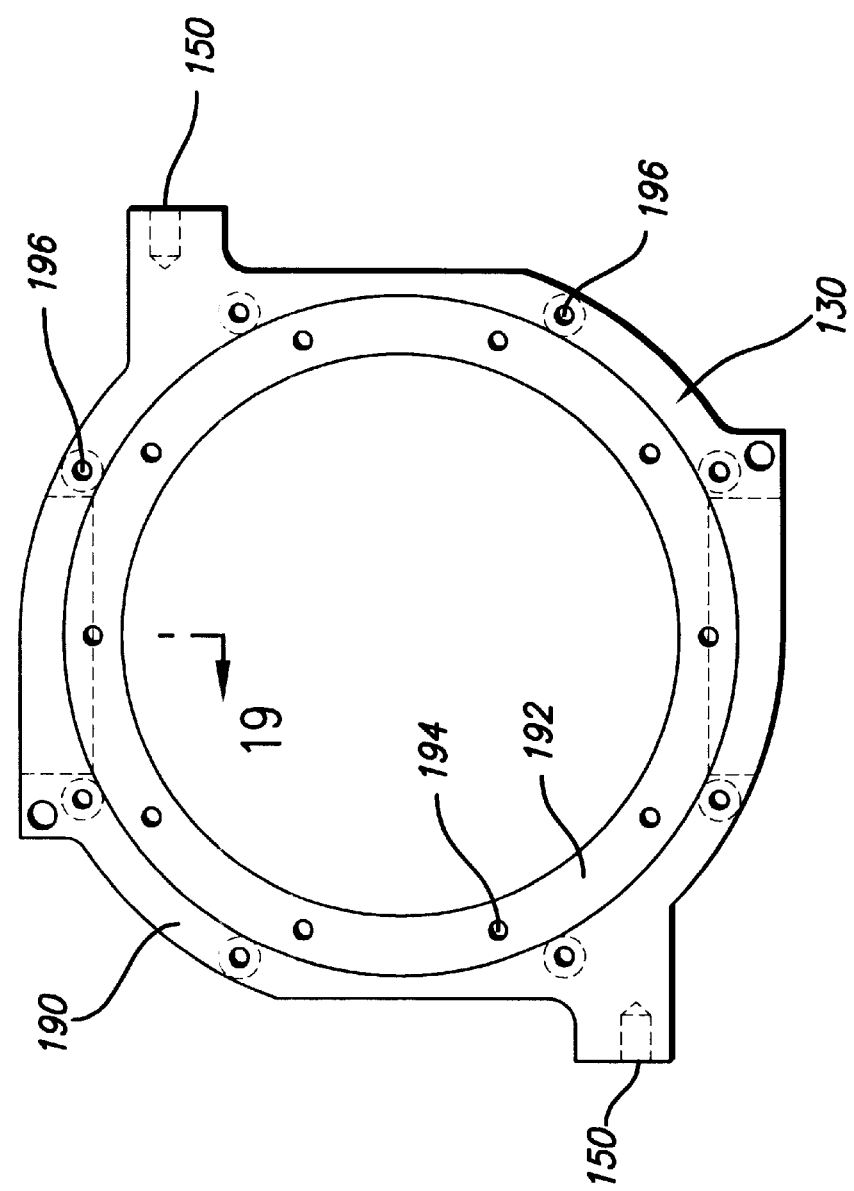

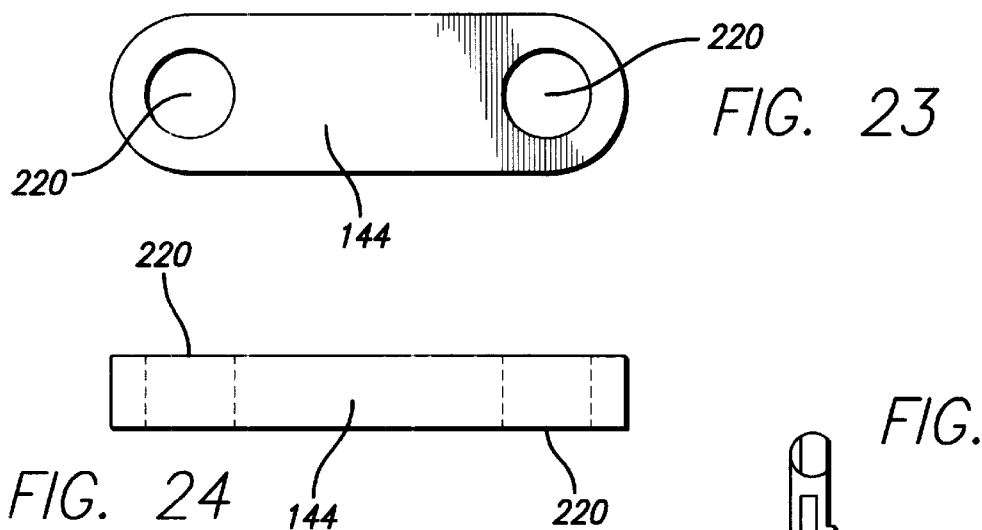
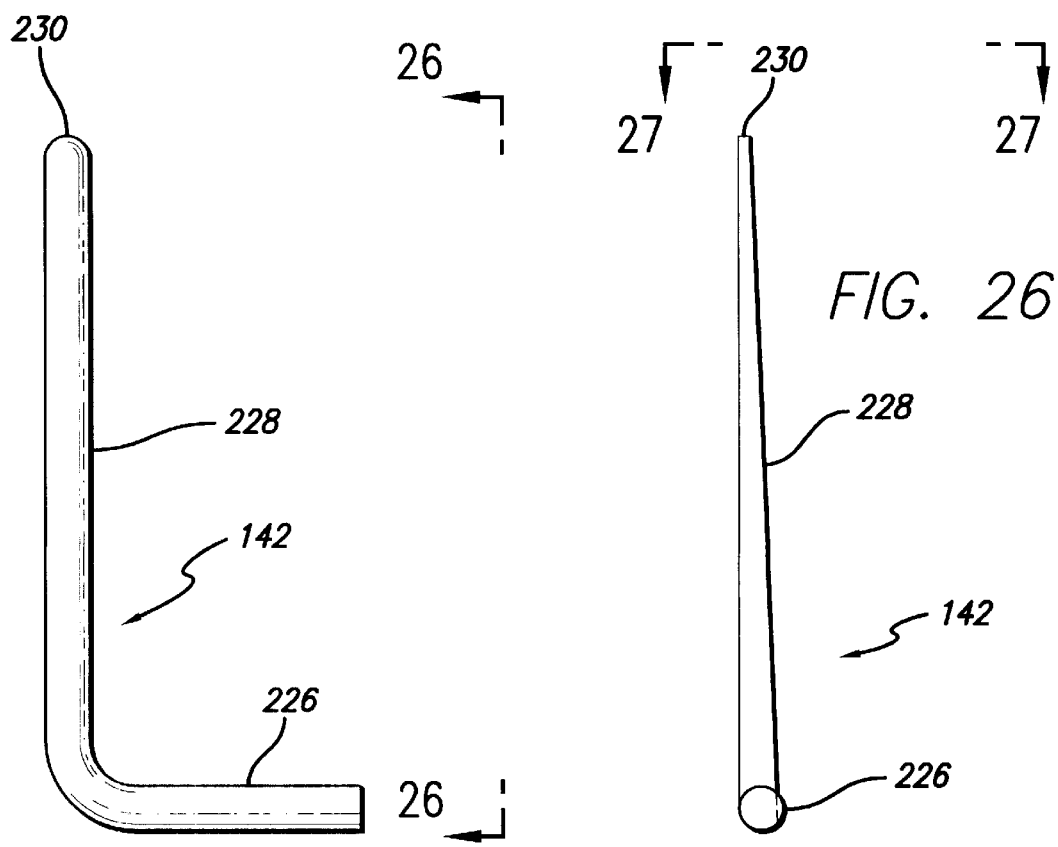

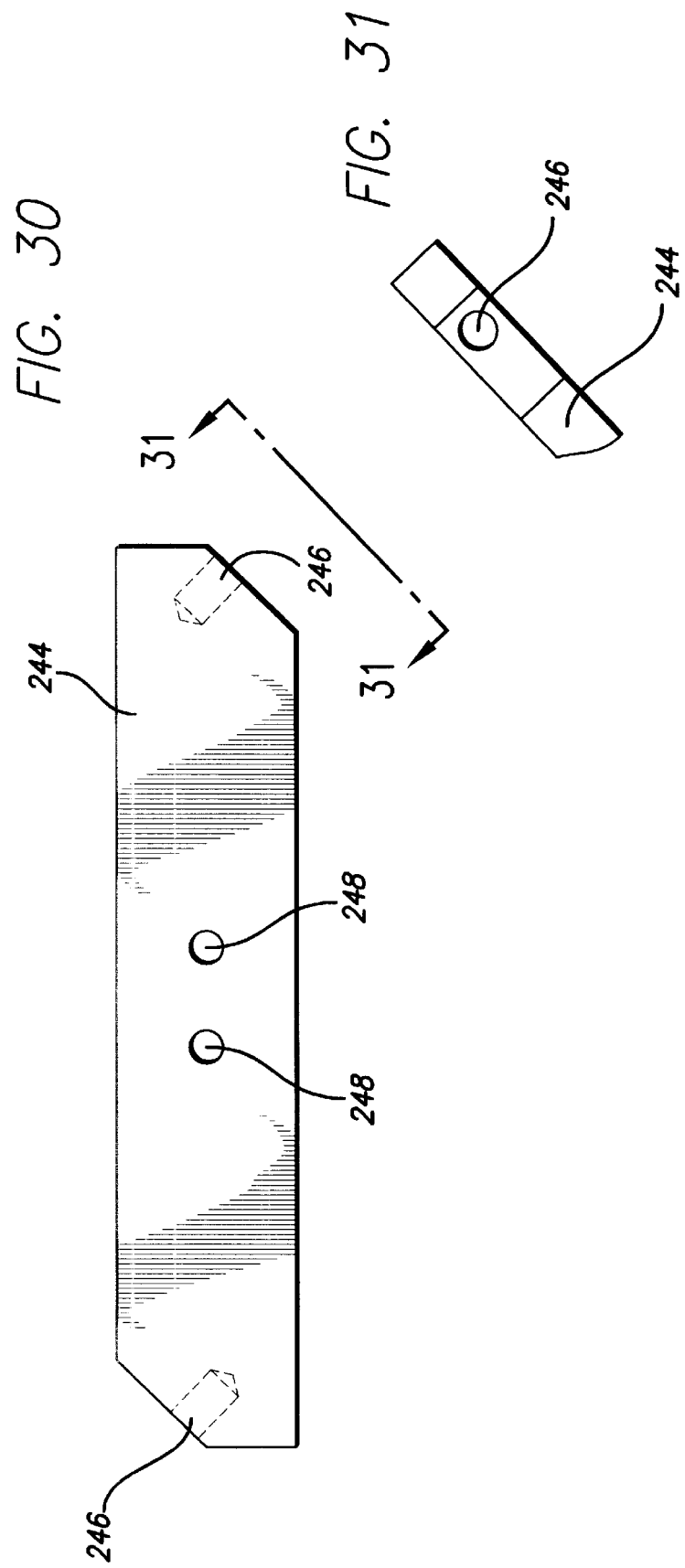

BOTTLE TRAVEL FLOWCHART

IN-LINE CONTINUOUS FEED SLEEVE LABELING MACHINE AND METHOD

BACKGROUND OF THE INVENTION

1. Field of the Invention

This invention relates to automatic labeling machines for bottles, containers, and the like, and more particularly to an in-line continuous sleeve or label applying machine that allows labels to be applied to the central portion of the bottle while the bottles remain in-line with the input and output bottle conveyors.

2. Description of the Related Art

Container or bottle banding and sleeving have become more important in the recent past. Recent consumer concerns about health and safety issues regarding the intact and untampered nature of product purchases led manufacturers and suppliers to seal the tops of containers with bands or the like that cannot be tampered with without showing evidence of such tampering. Such banding usually addresses only the top portion of the bottle or container and does not encounter the difficulties arising from sleeving the central portion of a bottle, such as a beverage bottle of the one-, two-, or three-liter variety.

With the advent of stronger plastics, beverage containers are often constructed of plastic or the like. The material is lightweight, easy to manufacture, generally inert with respect to the contents held within, and may be recyclable. For carbonated beverages, plastics that withstand the pressures generated by such a carbonated beverage safely hold the beverage within the container until the top is removed. Often the top is of the twist-off variety. Such bottles are generally not embossed, printed, nor otherwise incorporate a label of the contents as the manufacturer of the bottle may not know what contents will ultimately go into the bottle. Such bottles may be manufactured to certain specifications imposed by either the manufacturer, the Government or other regulatory agency, or both. By supplying a fungible good in the form of a beverage container, the purchaser or bottler can then fill the empty bottle with purified water, soda pop, pre-mixed tea, or the like for future sale. In order to inform the buying public of the bottle's contents, a label must go on the front conforming with the seller's preferences and any Government regulations involved. In the past, it has become a matter of convenience and economic efficiency to provide sleeves for the central portion of the bottle that act as the label identifying the bottler, the bottle's contents, and complying with any Governmental regulations regarding nutrition or otherwise.

The sleeves that are used to label plastic beverage containers are generally made of thin plastic and slip about the bottle to snugly engage the central portion thereof. By labeling generic or fungible bottles, the bottler or seller can use the same or similar bottles in marketing a variety of products under similar or different labels.

As separate sleeves are provided to label the bottle and its contents, it then becomes a problem in the art to provide a means, preferably high-speed automated means, by which such labels can be applied to plastic beverage containers. The prior art has attempted to address a machine that provides labeling of bottles at their center. However, all previous attempts generally do not maintain the in-line nature of the travel path of the bottle so that it travels in a generally straight line between the input conveyor to the sleeving/labeling machine and then on to the output conveyor.

As mentioned above, banding machines and the like (for example, U.S. Pat. No. 4,387,553, issued to Strub et al. on Jun. 14, 1983) do not provide the central sleeving required by bottlers and as provided by the present invention. Such banding machines only allow banding of the top of the container and completely fail to provide sleeving or banding of the central portion of the bottle. In the Strub et al. '553 patent, certain structures integral to the finger articulation and disengagement of the band onto the bottle prevent any central sleeving of the bottle as the label carrier cannot properly engage the bottle.

Consequently, sleevers and the like have attained generally complicated configurations such as U.S. Pat. No. 5,483,783 issued to Lerner et al. on Jan. 16, 1996. In the Lerner et al. '783 patent, bottles are essentially sleeved or banded. However, elevator pedestals that change the vertical disposition of the bottle as well as circular carousals that change the horizontal disposition of the bottle are present and prevent the bottles from being sleeved in an in-line fashion. Consequently, machines along the lines of the Lerner et al. '783 patent take up more space on the bottling room floor and provide a generally more complicated process avoided by the present invention. As is well known in the art, greater complexity in machinery generally leads to greater risk of failure, as there are more things to go wrong. Additionally, maintenance is greater and there are more adjustments necessary in order to provide proper bottle sleeving with more complicated machinery.

Consequently, there is a need in the art and a demand in the marketplace to provide an in-line and continuous feed bottle sleeving machine that enables bottles to be centrally sleeved while doing so in an in-line, continuous, and preferably high-speed fashion.

SUMMARY OF THE INVENTION

The present invention provides means by which sleeves may be applied to plastic beverage containers or the like in an in-line fashion. As set forth herein, sleeves and labels are considered to be equivalent to one another as are bottles and containers.

The present invention provides in-line and continuous feed sleeving of beverage containers by coordination between bottle entry into the machine, an iris carrier that applies the sleeve to the bottle, and pedestals that support the bottle during the sleeving process. A label feeder, as is known in the art, presents and provides sleeve labels to the iris carriers.

Each sleeve carrier, or iris carrier, has an open bottle-receiving central aperture circumscribed by a controllable label holder in the form of dilating finger rods. An iris carrier transport system shuttles the iris carriers between a label feeder and the unlabeled bottles. During the labeling process, the bottles are maintained at a constant elevation, neither rising nor falling, increasing mechanical efficiency in labeling, requiring machinery that is less mechanically complicated, and providing easier retrofitting for current bottle-labeling lines.

A timing screw receives bottles in flood feeder conveyor fashion to controllably space apart and move the bottles to the pedestals from the conveyor over a low-friction transition area. The bottles are then supported by the pedestals as the iris carriers circumscribe the top portions of the bottles. For an individual bottle, upstanding fingers present on the iris carrier fit the sleeve over the bottle as the iris carrier descends about the pedestal-supported bottle. Upon descending about the bottle to a preset level, the fingers of the iris carrier collapse slightly by moving radially inward in order to affix the sleeve to the bottle. The iris carrier then descends past the bottle, pulling the fingers downwardly and away from the label. The label disengages the fingers, freeing the iris carrier. The fingers dilate or expand slightly to move away from the labeled bottle. The iris carrier then ascends upwardly towards the top of the bottle. The bottle travels along to an output conveyor from the pedestals. The bottle is now sleeved and the iris carrier disengages the bottle and travels back to the label feeder to receive another sleeve in order to ensleeve another bottle.

The iris carriers are maintained in a horizontal position by having offset pivot points that travel along offset chain or other traveling carriers. By having offset points of rotation, the iris carriers are held in a horizontal position. The iris carrier does not rock or sway, especially during its engagement and ensleevement of the traveling bottle. By means of an articulated linkage driven by a circumferentially-sliding link ring, upstanding articulating fingers move inwardly and outwardly with respect to the open center of the iris carrier. The center of the iris carrier is generally open in order to receive and to travel about the bottle.

The bottle-supporting pedestals are generally arranged to maintain their upright position in a manner similar to the iris carriers. Offset pivoting points of attachment are present at the base of the pedestals that travel along chains offset by the same distance as the pedestal base offset. The pedestals are held in an upright manner without rocking or swaying. Consequently, bottles held or supported by such stable pedestals are less likely to tip over and are better disposed to receive the sleeve. Additionally, the tops of the pedestals may be fitted with a bottle-conforming tip in order to better engage and secure the bottles. Vacuum means may provide pressure differential in the form of suction in order to better hold the bottle on the top of the pedestal.

The bottles may also be held in place by a dual-sided tractor device that horizontally stabilizes the bottles as they travel on the pedestals. The stabilizer provides additional stability for the bottles as the sleeve is placed about the bottle and the iris carrier disengages the sleeve. The mechanical stresses present as the iris carrier releases the label may have some tendencies to jostle the container, particularly if it is empty. The stabilizer ensures that the container remains on the pedestal in its proper vertical position.

The entire bottle-engaging portion of the In-Line Continuous Feed Sleeve Labeling Machine of the present invention may be driven by a single AC motor driving a timing belt, synchronizing the entire bottle-sleeving operation.

A label feeder that feeds labels to the iris carriers may be pneumatically operated but synchronized by means of a flywheel and driving shaft, or the like, coupling the label feeder to the AC motor. A stepper motor may feed labels to a guillotine-type cutter, which then slices the appropriate label from a string, stream, or ribbon of labels. Articulating arms having suction ends engage and open the separated endless sleeve so that its open-bottom end may be fitted about the contracted fingers of the iris carrier. Upon receiving the label, the iris carrier fingers may then dilate or expand in order to snugly engage the sleeve about its maximum circumference. A spring holding the fingers open may serve to slightly stretch the sleeve, as may other biasing means.

By providing the In-Line Continuous Feed Sleeve Labeling Machine and Method of the present invention, containers, bottles, and the like may be sleeved about their central and predominant portion by introducing the present invention in line with a currently-existing conveyor system. This provides an easy retrofit and excellent means by which such bottles and the like may be ensleeved in an economically efficient, high-speed, and reliable manner.

OBJECTS OF THE INVENTION

It is an object of the present invention to provide a bottle-sleeving machine that sleeves bottles or containers with labels or the like in an in-line fashion, allowing the bottles to travel from an input conveyor to an output conveyor in a straight manner.

It is an additional object of the present invention to provide an iris carrier for sleeving bottles.

It is an object of the present invention to provide a pedestal system for supporting and carrying bottles.

It is an object of the present invention to provide coordinated ensleevement and support means by which such an iris carrier may travel about the central portion of the bottle and descend below it in order to disengage a sleeve.

It is an object of the present invention to provide in-line sleeving of containers in a reliable and high-speed fashion.

These and other objects of and advantages of the present invention will be apparent from a review of the following specification and accompanying drawings.

BRIEF DESCRIPTION OF THE DRAWINGS

FIG. 12 is a top plan view of the link ring used in the iris carrier of FIG. 7.

FIG. 13 is a side cross-sectional view of the link ring of FIG. 12 taken generally along line 13—13.

FIG. 14 is a top plan view of the wear ring used in the iris carrier of FIG. 7.

FIG. 15 is a side cross-sectional view of the wear ring of FIG. 14 taken generally along line 15—15.

FIG. 16 is a top plan view of an alternative embodiment of the wear ring of the present invention.

FIG. 17 is a side cross-sectional view of the wear ring of FIG. 16 taken generally along line 17—17.

FIG. 18 is a top plan view of the bottom chassis of the iris carrier of FIG. 7.

FIG. 19 is a side cross-sectional view of the bottom chassis of FIG. 18 taken generally along line 19—19.

FIG. 23 is a top plan view of the linkage bar shown in the iris carrier of FIG. 7.

FIG. 24 is a side view of the linkage bar of FIG. 23 showing the end holes in phantom.

FIG. 25 is a side elevational view of the finger rod of the iris carrier of FIG. 7.

FIG. 26 is an end elevational view of the finger rod of FIG. 25.

FIG. 27 is a top plan view of the finger rod of FIG. 25.

FIG. 30 is a top plan view of the base of the pedestal shown in FIG. 28.

FIG. 31 is a side view of the connecting portion of the pedestal base shown in FIG. 30 taken generally along line 31—31.

FIG. 34a is an on-end view of the opening of a label sleeve S by the label feeder of FIG. 34.

DESCRIPTION OF THE PREFERRED EMBODIMENT(S)

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

As shown in the Figures, the in-line continuous feed sleeve labeling machine 50 is shown generally in its entirety in FIGS. 1–6. The in-line continuous feed sleeve labeling machine 50 has the ability to sleeve or label bottles or containers continuously as they pass through the labeling machine 50. As used herein, the term "bottles" is synonymous with the term "containers" and related vessels, and the term "label" is synonymous with the term "sleeve" and the like, including other indicia that can be attached by the present machine to bottles.

Figure 1:
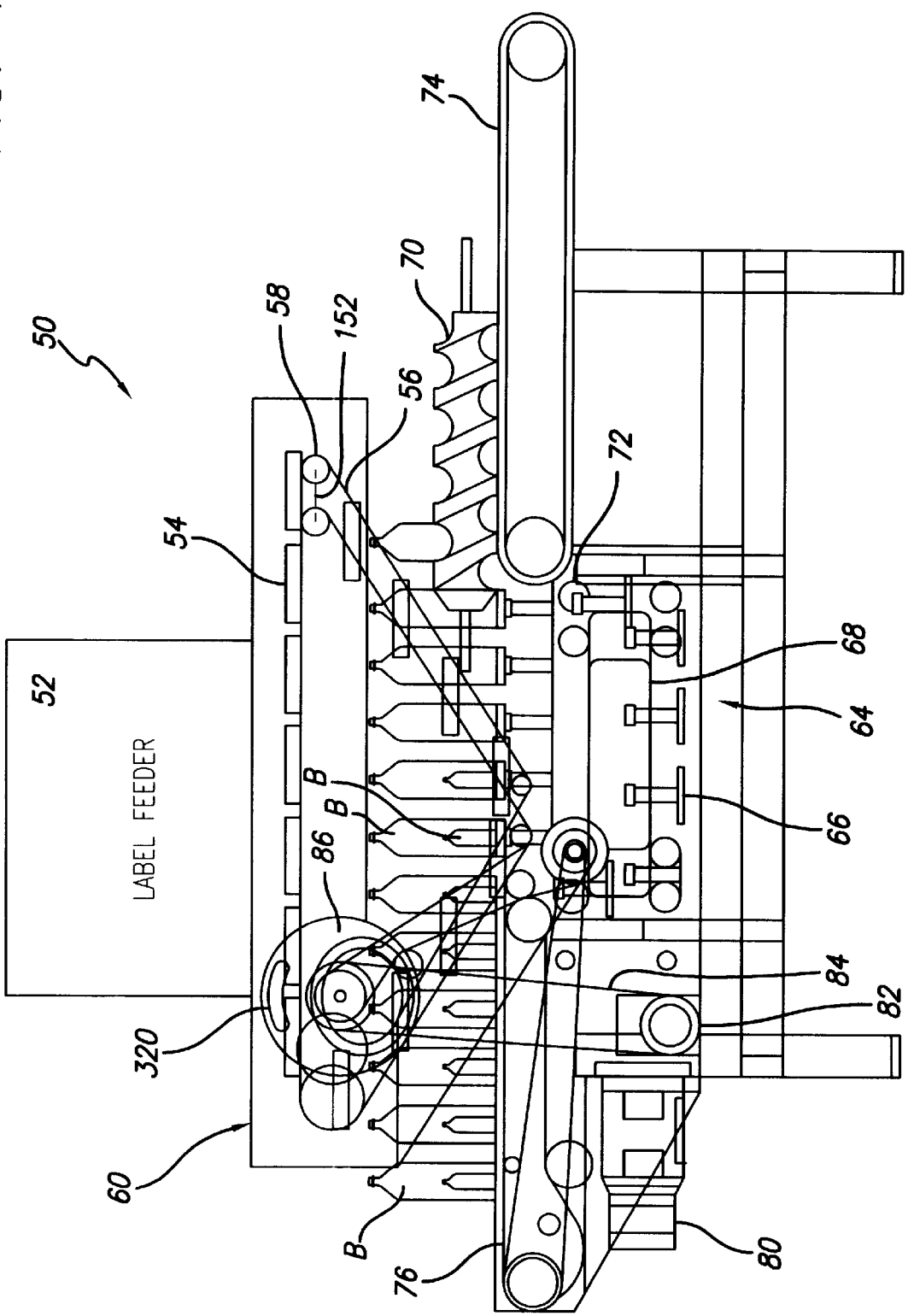
FIG. 1 is a front schematic plan view of the in-line continuous feed sleeve labeling machine of the present invention.

As shown in FIG. 1, the label feeder 52 is positioned over a series of iris carriers 54. The structure and operation of the iris carriers 54 are discussed in more detail below. The iris carriers 54 transport the sleeves to the bottles B as well as ensleeving them. The iris carriers 54 are carried along a track 56 in a generally horizontal position without rocking or swaying. As set forth in more detail below, the iris carrier 54 is pivotally attached to either side of the track 56 by means of spaced apart and offset pivots that may lie upon a diagonal in the plane defined by the iris carrier 54.

The track 56 may be a pair of endless chains spaced apart from each other according to the width of the iris carrier 54. The two lengths of endless chain making up the track 56 are also offset from parallel by the distance between the iris carrier pivot points. As set forth in more detail below, the chains are disposed so that as one of the iris carrier pivot points rounds a corner on one of the chain lengths, the other iris carrier pivot point is simultaneously also rounding its corresponding corner. Such a corner may be seen in FIG. 1 as indicated by reference number 58. Combined together, the series of iris carriers 54 and the track 56 comprise an iris carrier system 60.

A pedestal system 64 has a series of pedestals 66 conveyed in a cyclical manner on a pedestal track 68. In order to maintain the pedestals 66 in an upright manner, the bases of the pedestals are pivotally connected to the pedestal track 68 in an offset manner, much in the same way as the iris carriers 54 are pivotally attached to the iris carrier track 56. The operation of the pedestal system 64 is synchronized and coordinated with the operation of the iris carrier track 56 so that the rate of horizontal travel between the iris carriers 54 is the same as the horizontal rate of travel for the pedestals 66. In this way, a bottle B carried by a pedestal 66 may be vertically traversed by the iris carrier 54 without interfering with the travel of the bottle B upon the pedestal 66.

As shown in FIG. 1, the pedestal system 64 travels in a counterclockwise fashion while the iris carrier system 60 travels in a clockwise fashion. In this way, both the pedestal system 64 and the iris carrier system 60 are traveling in the same direction when they meet to, respectively, support and ensleeve a bottle B.

A timing screw 70 separates and aligns the bottles B for carrying upon the pedestal system 64. A low-friction transition plate 72 allows the low-friction timing screw 70 to move a bottle B from an input conveyor 74 to one of the pedestals 66 of the pedestal system 64. The timing screw 70 allows for a flood feed system in and to the in-line continuous feed sleeve labeling machine 50, where a number of individual bottles B are bunched about the timing screw 70. The timing screw 70 then picks up a single one of several adjacent available bottles B and moves it into synchronized position for pickup by the pedestal system 64 and ensleevement by an ensleeved iris carrier 54.

Once the bottle B has been ensleeved by an iris carrier 54, the bottle B is then transported to an exit conveyor 76. As the iris carrier 54 is making its vertical ascent up from the bottom of bottle B, it may be possible to use the horizontal motion of the iris carrier 54 to carry or move the bottle B horizontally/laterally from its associated pedestal 66 and onto the exit conveyor 76. A low-friction transition plate, such as the one used for introduction of the bottles B to the pedestal system 64, may be used. Until the iris carrier 54 disengages the bottle B and no longer encircles the bottle B, the horizontal rate of travel of the iris carrier 54 is the same as the horizontal rate of travel of bottle B.

In practice, bottles are ensleeved as follows. Bottles are transported to the in-line continuous feed sleeve labeling machine 50 of the present invention by the input conveyor 74 or otherwise. The bottles may be transported in a single-file fashion or via a flood feed. One, single bottle B is then picked up by the timing screw 70 at one of its furrows, so that only one bottle B is transported to the pedestal system 64 at any one time. The timing screw 70 is constructed so as to engage the bottle B generally at its center of mass so that there are few torques upon the bottle B. The bottle B may be trapped between the timing screw 70 and a rail or guard on the opposite side. The bottle B is then moved over the low-friction transition plate 72 and onto a pedestal 66 of the pedestal system 64.

As the bottle B makes its transition onto the pedestal 66, a sleeved iris carrier 54 moves synchronously with the bottle B. As the bottle B travels on the pedestal system 64 (in the case of FIG. 1, from right to left), the iris carrier 54 with its sleeve (not shown) descends about the bottle B. As the iris carrier 54 approaches the bottom portion of the bottle B, the sleeve is generally disposed about the central section of the bottle B. This central section is generally the desired section where the label is to be applied. Fingers present on the iris carrier 54 contract, causing the top of the sleeve or label to engage the exterior of the bottle B. The label (by friction fit about the bottle B or otherwise) begins to adhere to the side of the bottle B.

The fingers of the iris carrier 54 are generally smooth to provide a low-friction surface engaging the interior surface of the sleeve. As the sleeve adheres (at least slightly, but possibly more so) to the side of the bottle B, the iris carrier 54 and its sleeve-carrying fingers begin to disengage the sleeve, leaving it behind upon the bottle B. As the iris carrier 54 continues to descend towards the bottom of the bottle B and the top of the pedestal 66, the fingers increasingly disengage the sleeve, leaving it to circumscribe the exterior of the bottle at its central section.

As set forth in more detail below, the container stabilizer 350 shown in FIGS. 36 and 37 may help to disengage the label from the iris carrier 54 and apply it to the bottle B. In summary, the location of the container stabilizer is such that it may catch a top margin of the label and hold it to the bottle B as the iris carrier 54 slides out from within the label.

The iris carrier 54 descends until the sleeve-carrying fingers completely disengage the sleeve. At this point, the fingers then dilate, moving outward to expand the central aperture present in the iris carrier 54 the iris carrier 54 begins its upward ascent about the bottle B from its base to its top. In so traveling, the iris carrier 54 may help the bottle B to make the transition from the pedestal system 64 to the exit conveyor 76. Once the iris carrier 54 has fully disengaged the bottle B by ascending past its top, the iris carrier 54 is ready to receive another sleeve from the label feeder 52 and to sleeve another bottle.

The entirety of the in-line continuous feed sleeve labeling machine 50 of the present invention may be powered and synchronized by a single AC motor 80. The motor 80 may be a three-phase industrial-type motor as is known in the art. The motor 80 provides sufficient power to efficiently, consistently, and reliably power the label feeder 52, the iris carrier system 60, the pedestal system 64, the timing screw 70, the input conveyor 74, and the output or exit conveyor 76. A reduction gear 82 may be attached to the output shaft of the motor 80 to drive a timing belt 84. The timing belt 84 may then drive (from the flywheel system 86) gearing and belt systems coupled to the flywheel system 86. These in turn drive the input conveyor 74, the timing screw 70, the pedestal system 64, the iris carrier system 60, and the exit conveyor 76.

Where axles or shafts are present about the in-line continuous feed sleeve labeling machine 50 of the present invention, shaft extensions from such gears, sprockets, wheels, or the like extend away from the operational portion into a bearing so that the corresponding part (wheel, gear, sprocket, etc.) does not wobble, nutate, articulate, or the like when it turns. FIGS. 3–6 show these shaft extensions 90.

As part of the flywheel/driveshaft system that receives a power from the AC motor 80 via the timing belt 84, a torque overload protection mechanism 100 disengages when high torque occurs in the system, such as a jam in the gearing or otherwise. A disk in the torque overload protector 100 pushes off from a main section and trips a cutoff switch to immediately stop the in-line continuous feed sleeve labeling machine 50 of the present invention. The cutoff switch (not shown) may use regenerative braking or dynamic braking of the motor in order to stop the machine 50 as soon as possible. With such quick cessation of the operation of the labeling machine 50 of the present invention, the risk of injury is reduced as is the degree of injuries sustained should a body part (such as a finger or arm) become stuck or caught in the labeling machine 50. Additionally, the components of the labeling machine 50 are also protected from injury as excessive torque or force is quickly detected and contemporaneously relieved with the cessation of operations. The overload protection mechanism 100 may be easily reset to provide quick restarts and minimize downtime once the jam has been cleared.

Figure 2:
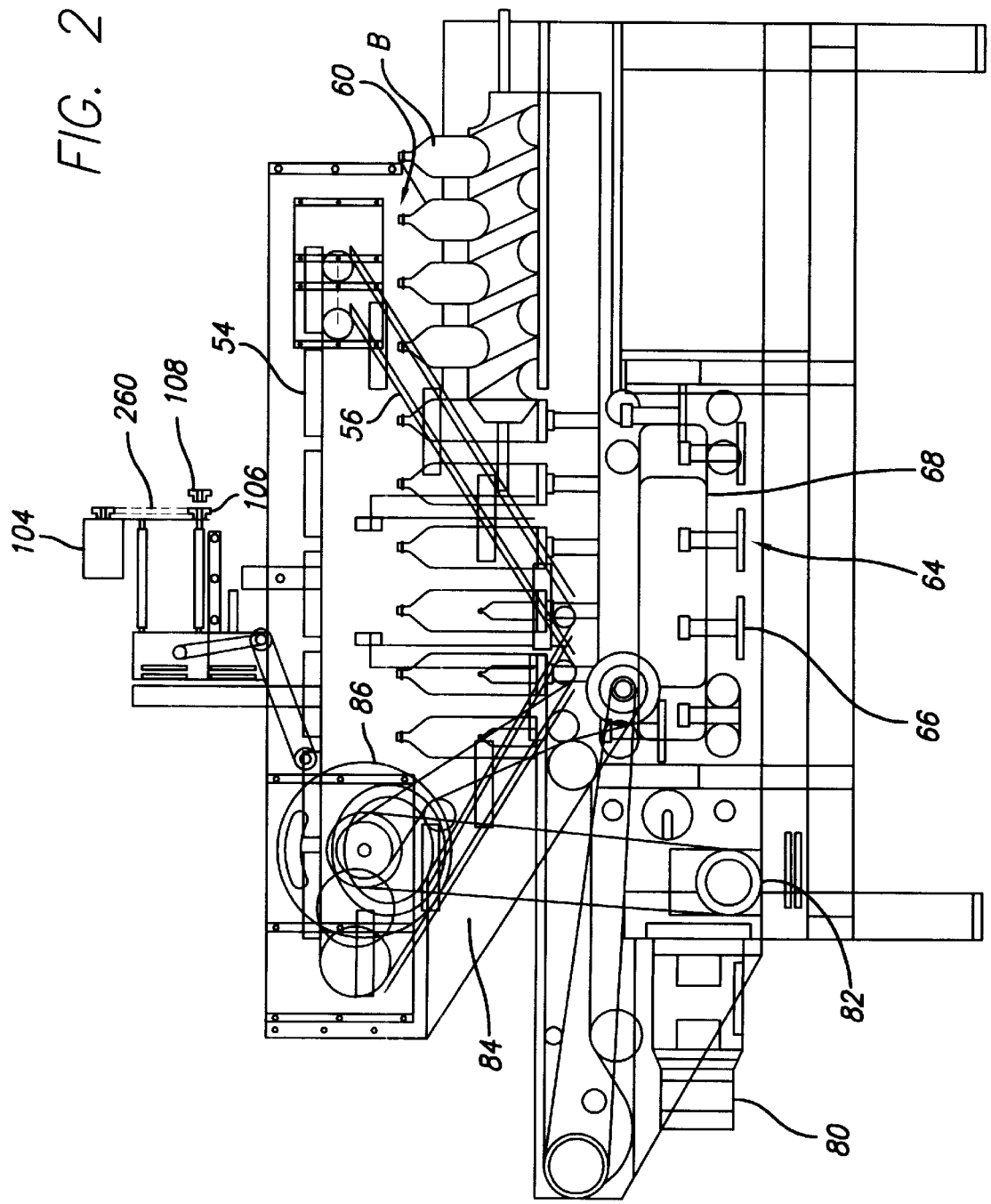
FIG. 2 is a front schematic plan view of the present invention.
Figure 3:
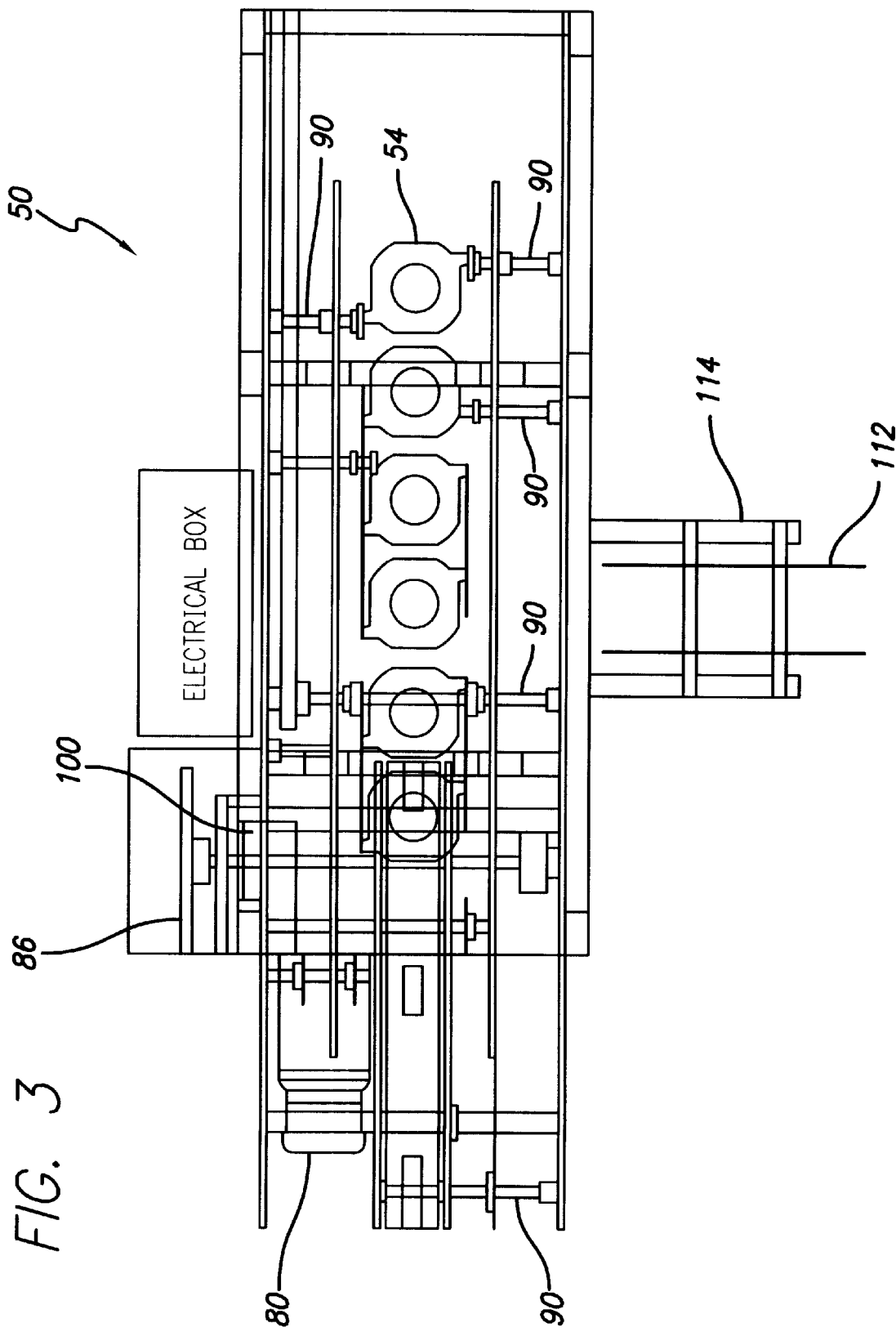
FIG. 3 is a top schematic plan view of the present invention.
Figure 4:
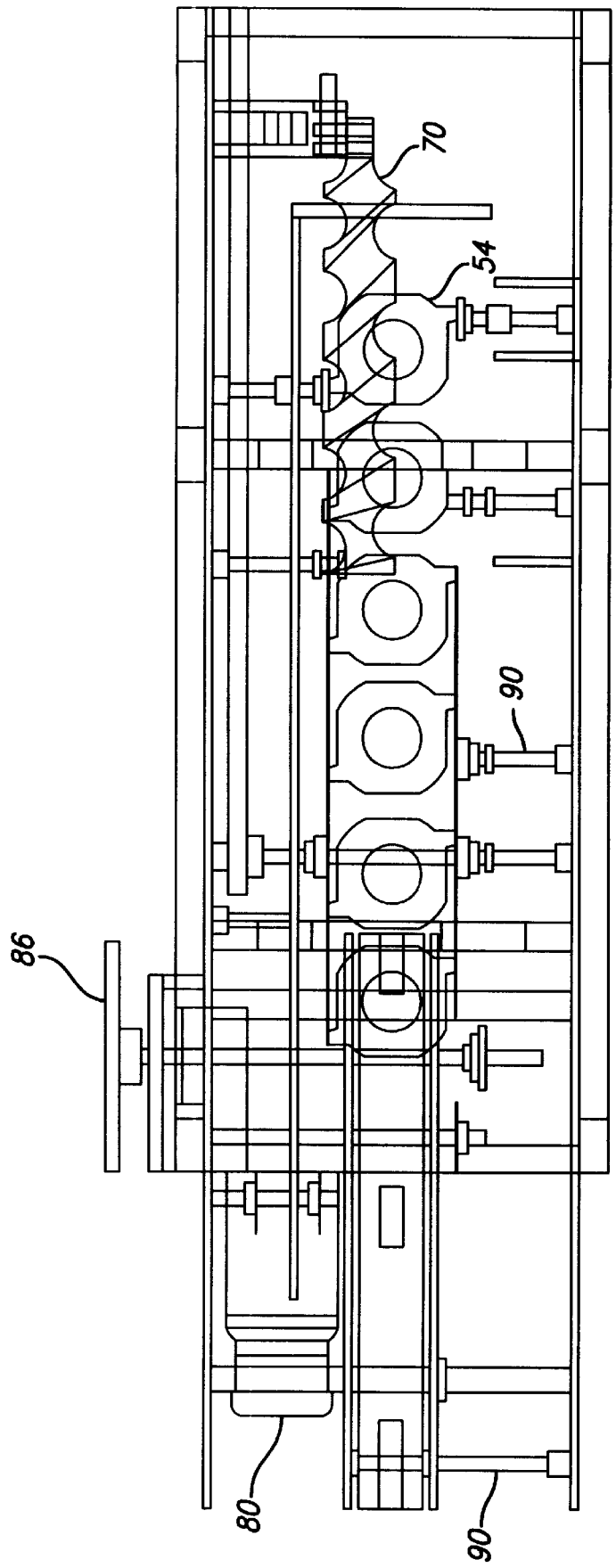
FIG. 4 is a top schematic plan view of the present invention.
Figure 5:
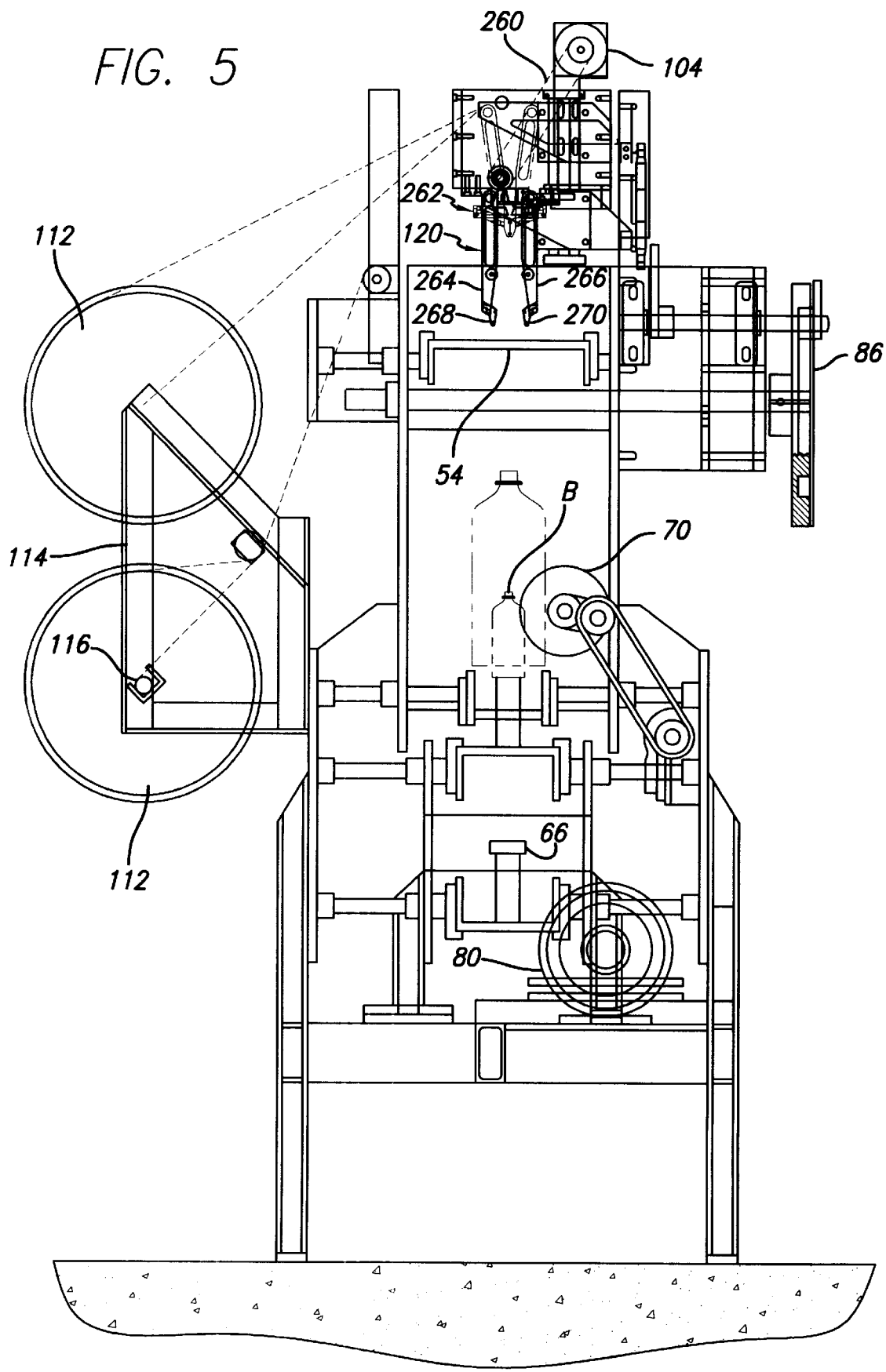
FIG. 5 is a left side schematic plan view of the present invention.
Figure 6:
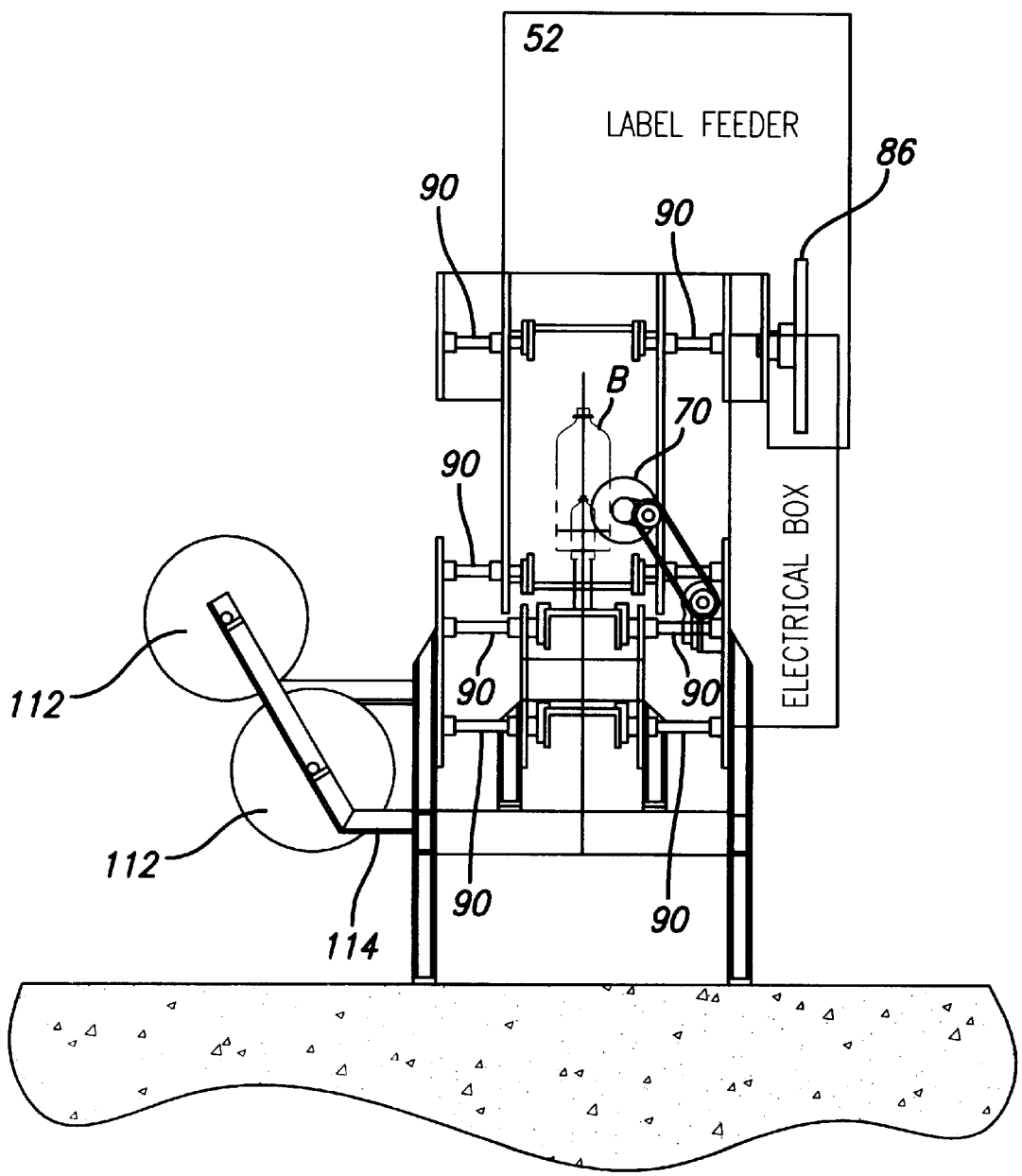
FIG. 6 is a left side schematic plan view of an alternative embodiment of the present invention.

In FIG. 2, the stepper motor 104 serves to control a nip roller 106 having a manual operation knob 108. The nip roller 106 receives a ribbon or stream of labels from label rollers 112 (FIG. 5) held in place by a stand or label holder 114 supporting spools of labels 112 on rods or shafts 116. The nip roller 106 controls the travel of the unspooled label web into the label machine 50 of the present invention. The stepper motor 104 controls the length and rate of travel of the labels. The stepper motor 104 causes the labels to pause briefly so that they may be cut by a guillotine-type or other mechanism as the terminal sleeve label being severed is engaged by sleeve feeding arms 120. The sleeve feeding arms 120 are shown in more detail in FIGS. 32 and 33. The stepper motor 104 is also shown in more detail in FIG. 34 with the nip roller 106 shown in more detail in FIG. 35.

In order to better secure the bottles B upon the pedestal 66 as they are being ensleeved by the iris carriers 54, a weighted blanket or the like (not shown) can engage and travel with the top of the bottles B in order to stabilize them upon the pedestal 66. The stabilization blanket or pad may be of an endless configuration that moves on rollers in a loop at the same horizontal rate of travel as the bottles B. Additionally, the pedestal 66 may incorporate a vacuum system whereby the base of the bottle B is held in place on the pedestal as suction is present at the top of the pedestal 66.

The pedestal P may have a top that engages a variety of bottle sizes, such that the utility of the labeling machine 50 of the present invention is enhanced due to the variety of bottles or containers B it can ensleeve. Both large and small bottles B are shown in FIG. 1 on the pedestals 66. With different sizes or volumes of bottles B, certain adjustments may necessarily need to be made. However, the labeling machine 50 of the present invention is contemplated as being able to handle bottles of any size although certain parts may need to be remanufactured for very large or very small bottles. Despite such re-manufacture, the basic and fundamental portions of the labeling machine 50 of the present invention as set forth herein should be applicable to such bottles B.

Having described the overall operation of the labeling machine 50 of the present invention, description is made of individual portions thereof so that those with knowledge of the art may better understand the labeling machine 50 of the present invention. The drawings with this associated description provide the knowledge necessary to enable successful construction and manufacture of the labeling machine 50 of the present invention.

Figure 7:
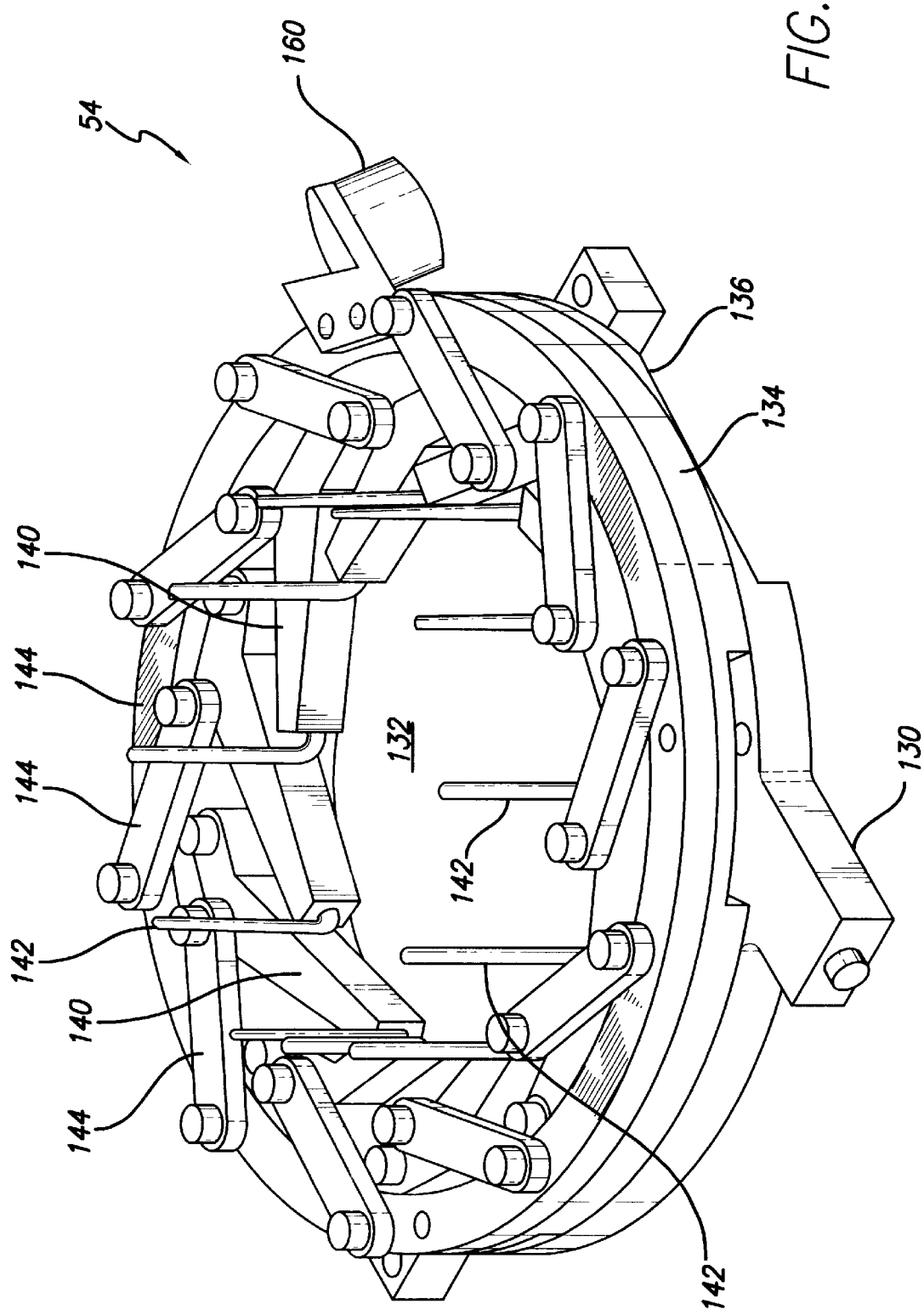
FIG. 7 is a top perspective view of the iris carrier, or armature, of the present invention.

FIG. 7 shows in perspective view one of the iris carriers 54 of the present invention. The iris carrier 54 has a base 130, which provides the basic chassis for the iris carrier 54 of the present invention. As indicated by FIG. 7 and the other drawings regarding the iris carrier 54, the iris carrier 54 has a generally open central portion 132 through which the bottle B passes during the ensleevement process. The open nature of this aperture 132 is important as the iris carrier 54 must pass about the exterior of the bottle B in order to ensleeve it properly at its central portion. Consequently, accommodations and certain engineering requirements are necessary in order to provide the articulation of the iris carrier components to achieve proper, reliable, and adjustable ensleevement.

Figure 10:
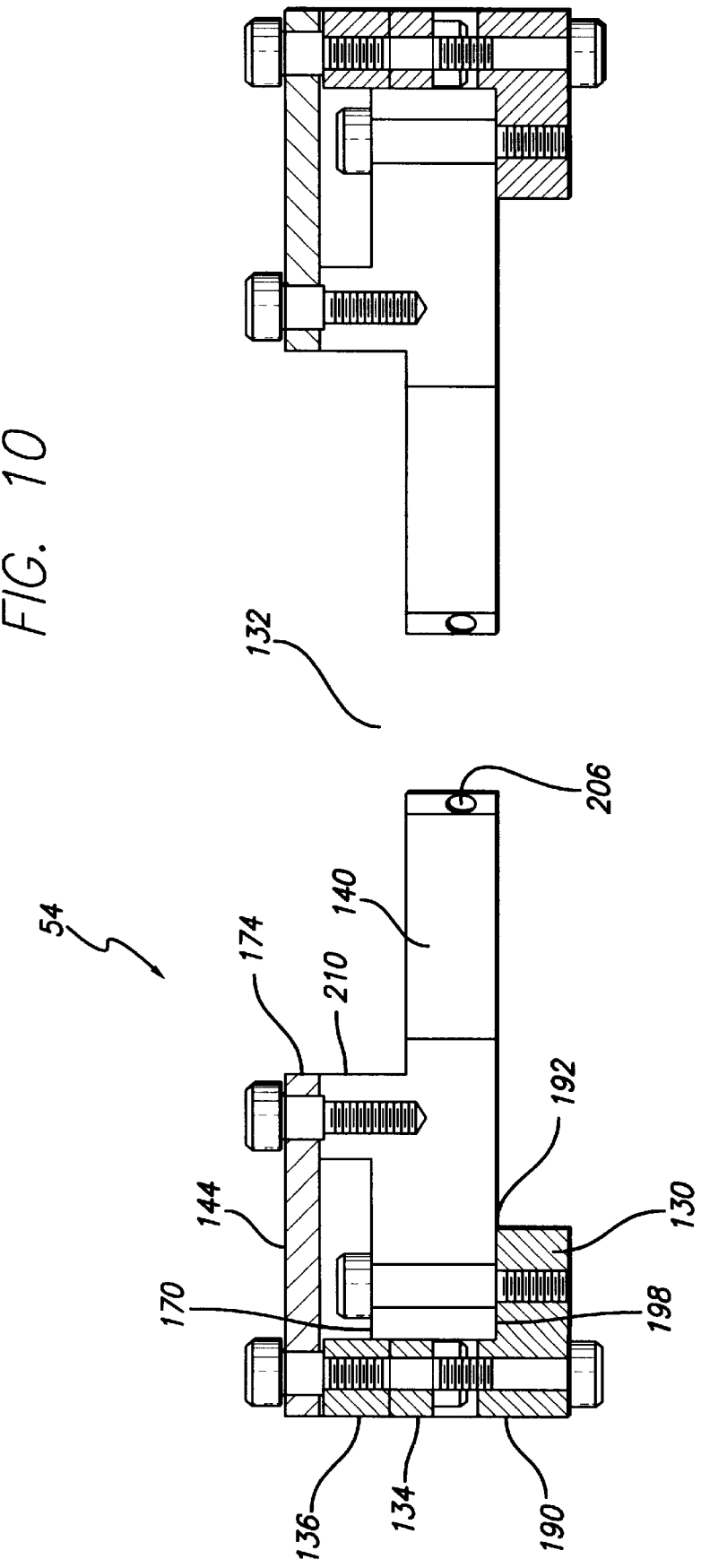
FIG. 10 is a side and partial cross-sectional view of the iris carrier of FIG. 9 taken generally along line 10—10.

A cross-section of the iris carrier 54 is shown in FIG. 10. There, the base 130 of the iris carrier 54 supports a wear ring 134 that circumscribes the central aperture 132. Atop the wear ring 134 is a link ring 136 which slides rotatingly atop the wear ring 134 in order to articulate the radial arms 140 with their attached finger rods 142. The radial arms 140 are pivotally coupled to the base 130 and are articulably coupled to the link ring 136 by a linkage bar 144. The linkage bar 144 is pivotally coupled to both the link ring 136 and the radial arm 140. By restricting the degrees of freedom and the extent to which the radial arms 140 can articulate, the iris carrier 54 controls the finger rods 142 attached to the radial arms 140.

Figure 9:
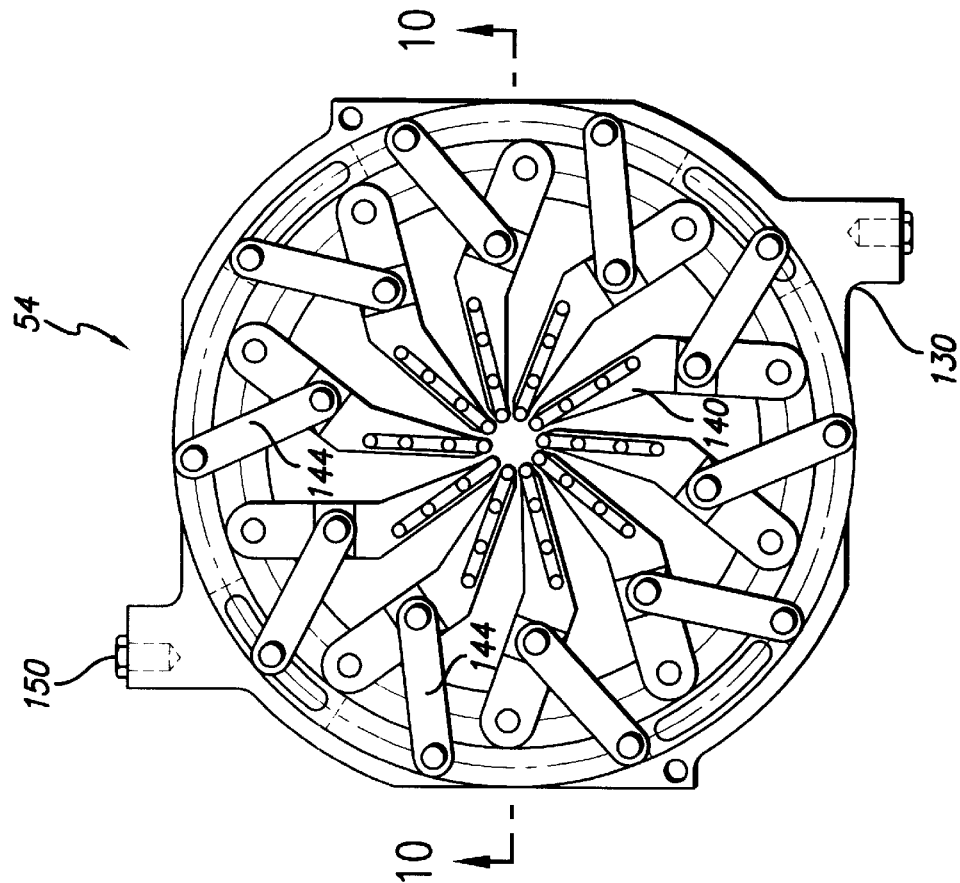
FIG. 9 is a top plan view of the iris carrier of FIG. 7 shown in a contracted position with the radial arms extending inward towards the center of the iris carrier.
Figure 8:
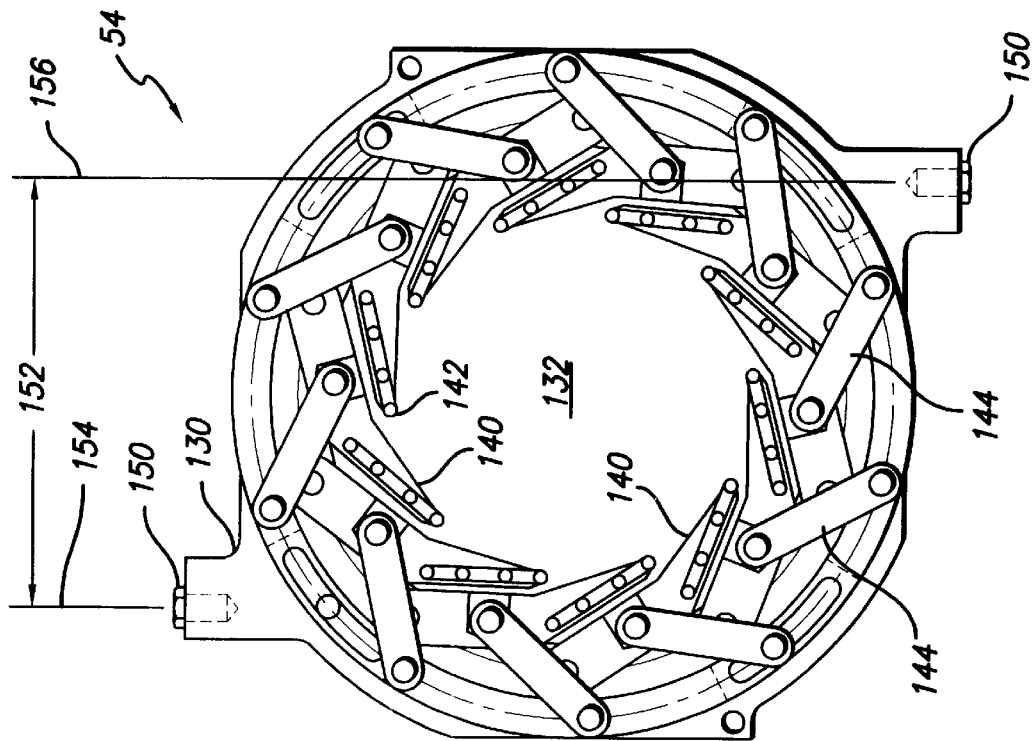
FIG. 8 is a top plan view of the iris carrier of FIG. 7 shown in an open or dilated position.

FIGS. 8 and 9 show the dilated (FIG. 8) and contracted (FIG. 9) configurations of the iris carrier 54. FIGS. 8 and 9 also show the offset nature of the pivotable connections 150 that the iris carrier 54 makes with the iris carrier track 56. The pivotable connections 150 are the means by which attachment of the iris carrier 54 can be made with the iris carrier track 56 in order to keep the iris carrier 54 in a horizontal and bottle-engaging position. As indicated in FIG. 8, there is an offset 152 present between the two diagonally-opposed pivotable connections 150 of the iris carrier 54. This horizontal offset 152 maintains the iris carrier 54 in a horizontal position without swaying, jiggling, or rocking as it travels upon the iris carrier track 56.

When one side, for example the left side, of the iris carrier 54 is urged or forced to pivot about its corresponding pivotable connection 150 (in this case, the left pivotable connection in FIG. 8), the rotation about the axis 154 of the pivotable connection 150 would cause the other side of the iris carrier 54 to travel in the opposite direction. For example, if the left side of the iris carrier 54 in FIG. 8 were lifted upward to pivot about the upper left pivotable connection 150, the opposite and right side of the iris carrier 54 would have to swing downward. As the two pivotable connections 150 of the iris carrier 54 are offset, the opposite (right) pivotable connection 150 holds the opposite side in place, preventing any rotation about the axis 154 of the left pivotable connection 150.

The horizontal offset 152 must be accommodated by the iris carrier track 56 and the opposed chains or other carriers must be horizontally offset by the same offset 152 (FIG. 9) which is present at the iris carrier 54. As mentioned above, when the iris carrier 54 reaches a corner such as that shown at 58 in FIG. 1, the two pivotable connections 150 allow the iris carrier 54 as a whole to turn with respect to the track 56. However, the iris carrier 54 cannot pivot, turn, rock, or sway with respect to one individual side of the track 56. Consequently, a horizontal position is maintained by the iris carrier 54 throughout its travel on the iris carrier track 56. The same is similarly true for the pedestals 66 and the pedestal system 64 as they travel upon the pedestal track 68.

As shown in FIG. 7, a cam roller 160 may be attached to the link ring 136. The cam roller shown in FIG. 7 is tilted at an angle and generally corresponds to the cam roller necessary for the slight contraction of the finger rods 142 necessary for disengaging the sleeve from the iris carrier 54 as the sleeve engages the bottle B. Another cam may be attached to the link ring 136 in order to fully contract the finger rods to a configuration such as that shown in FIG. 9. A spring or other biasing means (not shown) holds the iris carrier 54 in the dilated configuration as shown in FIG. 8 by default. It is only upon the urging of the cam rollers 160 or 162 by cams present in the labeling machine 50 of the present invention that the radial arms 140 with the finger rods 142 contract to place the finger rods 142 closer to the center of the iris carrier 54.

When one of the cam rollers 160, 162 is engaged by a cam, it causes the link ring 136 to pivot with respect to the iris carrier 54 as a whole about its central axis perpendicular to the plane of the central aperture 132. As shown in FIG. 10, the link ring 136 shares a small common shoulder or collar 170 with the radial arm 140. The link ring 136 is consequently constrained to travel in a circle outside the several radial arms 140. Additionally, the linkage bars 144 constrain the motion of the link ring 136 to circumferential path motion about the iris carrier 54 and above the wear ring 134.

There is an offset 176 between pivotable attachment 174 of the linkage bar 144 with the radial arm 140 and the pivotable attachment 172 of the radial arm 140 with the base 130. This offset 176 provides a moment for the linkage bar 144, allowing it to control the pivoting motion of the radial arm 140. The link ring 136 controls the linkage bar 144 and, in comparing FIGS. 8 and 9, it can be seen that the link ring 136 turns in a clockwise motion to press the linkage bars 144 against the radial arms 140 to close them. The radial arms 140 pivot upon their pivotable attachment to the base 130 to bring forward the finger rods 142. When the link ring 136 is fully rotated, its travel is limited by the extent to which the linkage bars 144 can travel in conjunction with their pivoting attachment with the radial arm 140.

As the linkage bars 144 are generally longer than the distance between the radial arms attachment 172 to the base 130 and the pivotable attachment 174 of the linkage bar 144 with the radial arm 140, the linkage bar 144 can extend the radial arms 140 only a certain distance into the central aperture 132 of the iris carrier 54. Consequently, the fact that the link ring 136 is held in place upon the wear ring 134 by the shoulder/collar 170 shared between the link ring 136 and the radial arm 140, and the fact that the linkage bars 144 prevents the full circular travel of the link ring 136 with respect to the iris carrier 54, the articulation of the radial arms 140 is controlled by the degree with which one of the cam rollers 160, 162 articulates the link ring 136 with respect to the iris carrier 54.

Figure 11:
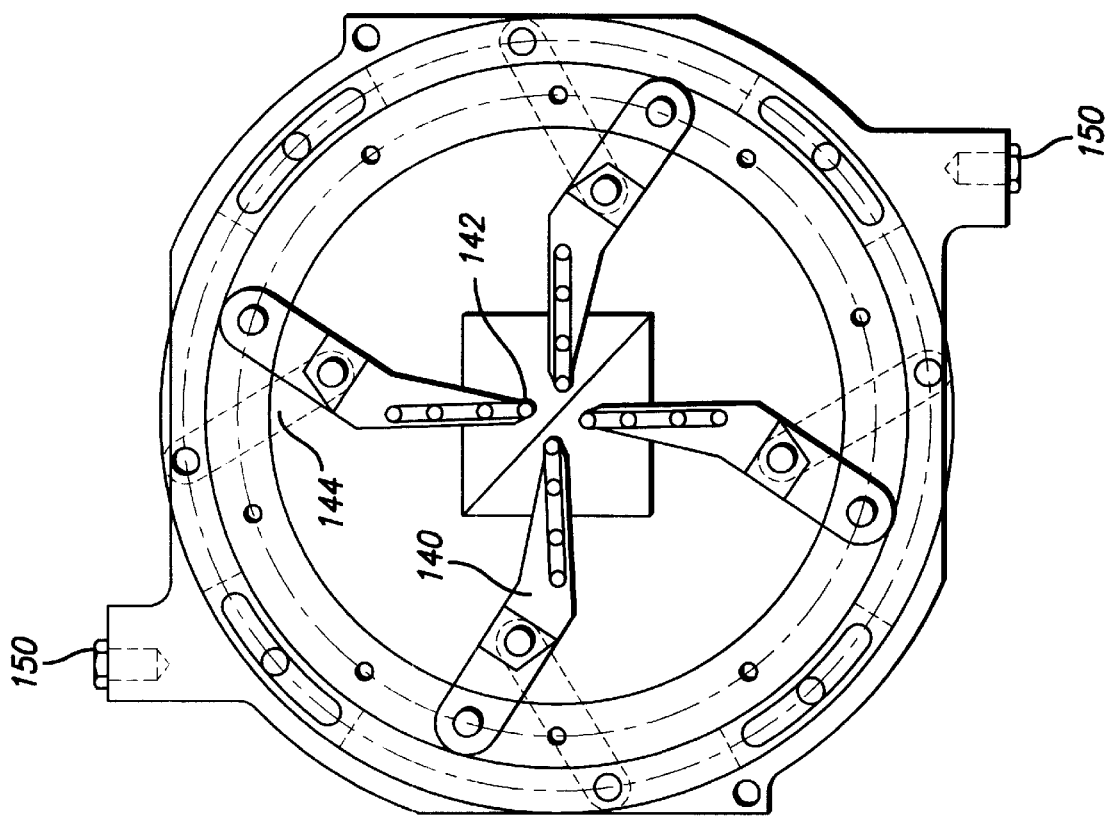
FIG. 11 is a top plan view of an alternate embodiment of the iris carrier of FIG. 7 of the present invention showing four (4), rather than ten (10), radial arms.

FIG. 11 shows an alternative embodiment of the iris carrier 54 of the present invention, having four rather than ten radial arms 140. The use of a lesser number of radial arms 140 may be appropriate in some circumstances and may provide some efficiencies and mechanical simplicities over having several or more radial arms 140.

FIGS. 12 and 13 show the link ring 136 that slides over the wear ring 134 to provide the articulation of the radial arms 140 through the linkage bars 144. As is shown in FIG. 12, the link ring 136 has a number of apertures or holes 180 through which fasteners, such as the fasteners upon which the linkage bars 144 pivot, may be attached.

FIGS. 14 and 15 show views of the wear ring 134. The wear ring 134 not only has through holes 182, but also furrows, gaps, or radial slots 184. The radial slots 184 generally allow the upper link ring 136 slidable attachment with the lower wear ring 134.

A shoulder-type bolt (not shown) may pass through the lower wear ring 134 and project upwardly through the link ring 136 and may also pass through the linkage bar 144 before threading through a nut or the like. The shoulder of the shoulder bolt may pass through the radial slot 184, allowing the shoulder bolt to slide along the length of the radial slot 184. As the shoulder bolt passes through a hole present in the link ring 136, the link ring of the shoulder bolt has limited travel through the link ring 136, however, it can travel along the length of the radial slot 184 in the wear ring 134. The shoulder bolt then limits the relative rotational travel between the lower wear ring 134 and the upper link ring 136 while allowing the upper link ring 136 slidable attachment to the lower wear ring 134. The lower wear ring 134 may be coupled or fixed to the iris carrier base 130 so as to provide a stable be and mechanically coupled linkage by which the iris carrier 54 may suitably and connectably articulate.

Alternative constructions or designs may be used where the wear ring 134 has no radial slots. In one alternative embodiment, the upper link ring 136 may be coupled to the lower wear ring 134 by means of bearing spools placed around the periphery of the two rings 134, 136.

The wear ring 134 may serve as a self-lubricating junction between the link ring 136 and the base 130. Self-lubricating or low-friction plastics such as polypropylene or substances such as Teflon® may provide the material for the wear ring 134. Fasteners or other means of attachment may be used in order to provide the pivoting and/or pivotable connections necessary to achieve the present invention.

FIGS. 16 and 17 show an alternative embodiment of the wear ring 134 without the furrows 184, yet having an extending flange 188 that may serve to provide containment for the link ring 136 so that it may travel within the confines defined by the circular area defined by the flange 188 of the wear ring 134.

FIGS. 18 and 19 show the base, bottom, or chassis 130 of the iris carrier 54. The base 130 has an outer ring 190 and an inner ring 192. The transition between the inner ring 192 and the outer ring 190 provides a shoulder 198 (FIG. 10) against which the radial arms 140 can rest in conjunction with the wear ring 134 and the link ring 136 as shown in FIG. 10. A number of apertures 194 are present in the inner ring 192 through which fasteners may be threadably attached to the pivotable radial arms 140. The holes 196 present on the outer ring 190 serve to provide pivotable fastener points for the linkage bars 144 as shown in FIG. 10.

Figure 20:
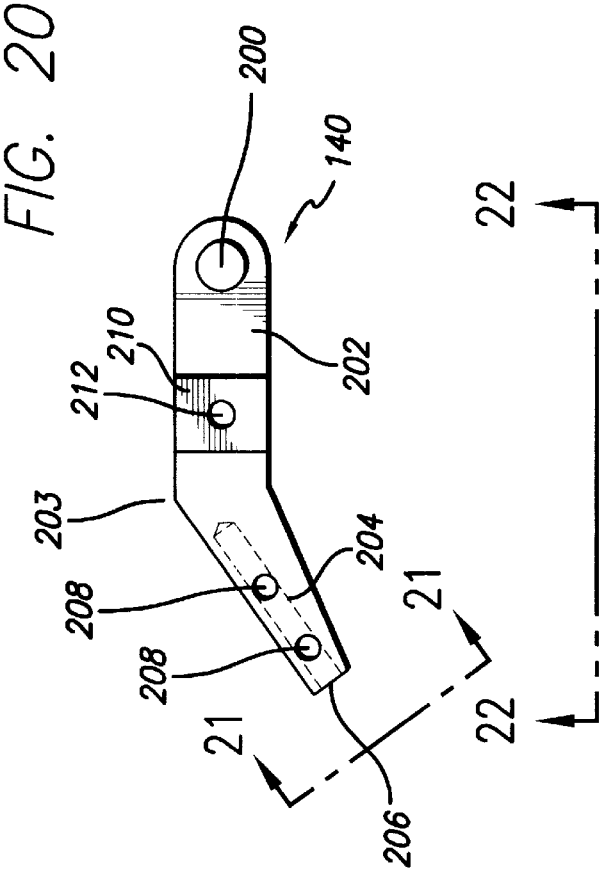
FIG. 20 is a top plan view of the extending radial arm of the iris carrier of FIG. 7.
Figure 22:
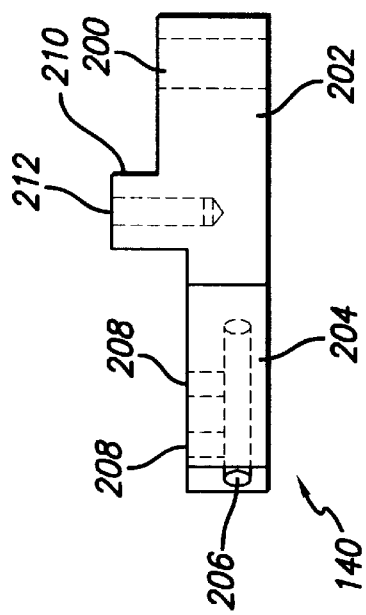
FIG. 22 is a side and partial cut-away view of the extending radial arm of FIG. 20 taken generally along line 22—22.
Figure 21:
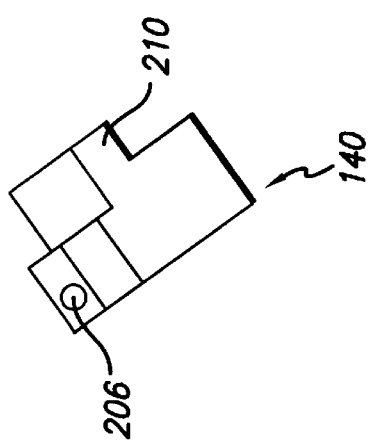
FIG. 21 is a side view of the extending radial arm of FIG. 20 taken generally along line 21—21.

FIGS. 20–22 show one of the radial arms 140. The radial arm 140 has base aperture or hole 200 through which it is pivotally attached to the iris carrier base 130. The radial arm 140 extends forwardly from the base hole 200 to a bend 203 of approximately 36° in order to provide a base extension 202 that becomes an extension 204 for the finger rod 142. The finger rod 142 fits into a finger rod aperture 206 which receives the base end of the finger rod. Screw holes 208 may be present in order to removably attach the finger rod 142 as by recessed screws or the like.

As shown in FIG. 22, the radial arm 140 has an upward extension 210 that rises above the base extension 202 to provide a horizontal or flat height between the pivotable points of attachment for the linkage bar 144. The radial arm 140 then descends as it travels out to the terminal end of the finger rod extension 204. The upward linkage bar support 210 has generally at its center a threaded hole 212 into which a fastener threads in order to pivotably hold the radial arm end of the linkage bar 144 in place.

As shown in FIGS. 23 and 24, the linkage bar 144 has two symmetrical holes 220 formed at opposite ends. These holes 220 are those that are used to attach the linkage bar 144 to the link ring 136 at one end and to the radial arm 140 at the other. In one embodiment, the linkage bar 144 may be approximately 1⅝" to 1¾" long and approximately ½" wide.

In FIGS. 25–27, the finger rod 142 is shown in a variety of views. The finger rod 142 is generally a smooth curved piece of strong material, such as metal or strong plastic. The finger rod 142 has a horizontally extending base portion 226 and a vertically extending finger portion 228. In one embodiment, the horizontal base 226 is generally circular in nature while the cross-section of the upwardly extending finger portion 228 may be flattened on its sides to provide outward structural support able to withstand the restoring force or pressure of the sleeve or label when the sleeve is stretched outwardly by the iris carrier 54. The top 230 of the finger rod 142 is generally rounded to ensure that it does not snag or catch upon the sleeve or label.

Figure 28:
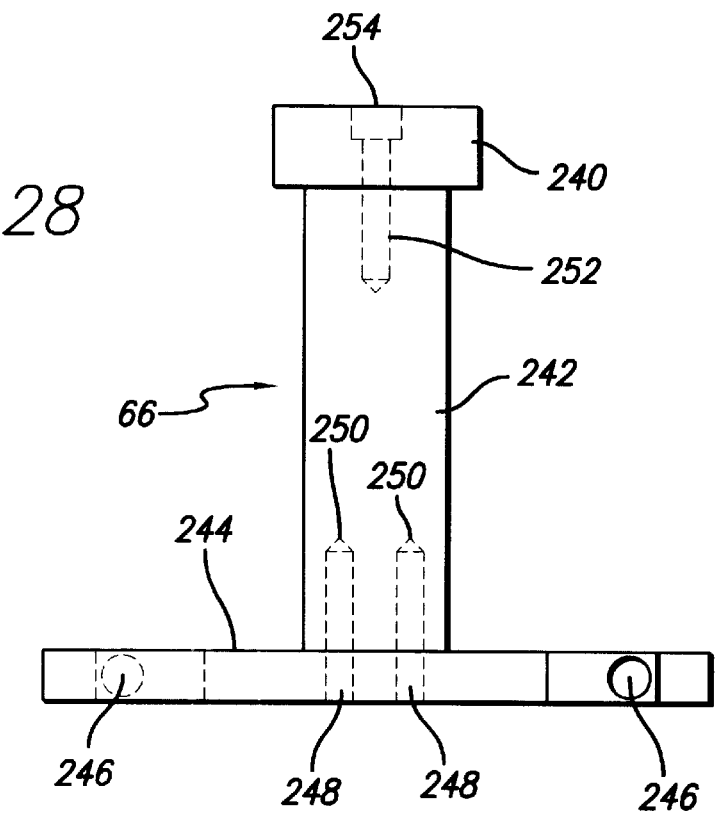
FIG. 28 is a side elevational view of the pedestal used in the present invention as shown in FIG. 1. Internal apertures and structures are shown in phantom.
Figure 29:
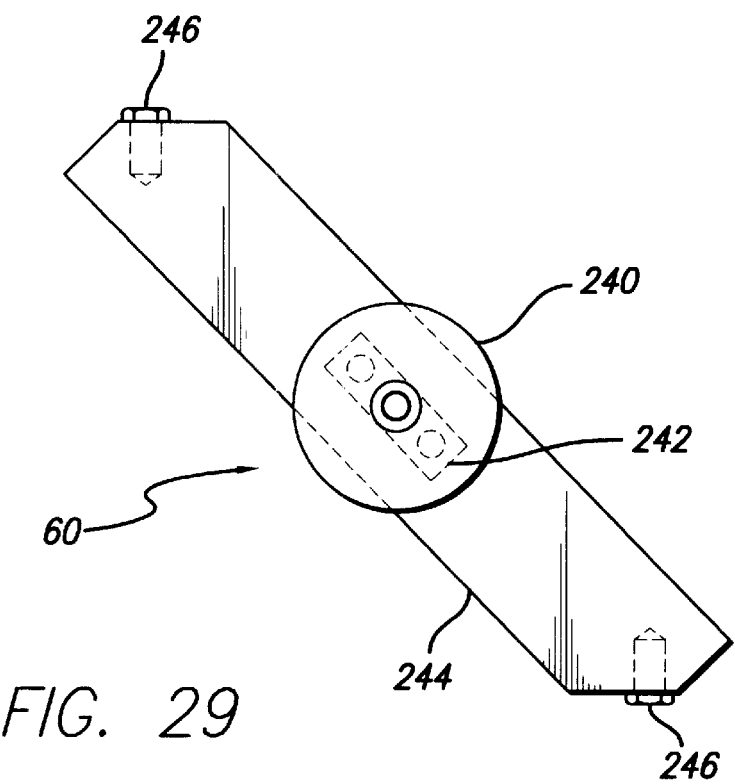
FIG. 29 is a top plan view of the pedestal shown in FIG. 28.

FIGS. 28 and 29 show views of a pedestal 66. Each pedestal 66 has a top 240, a central pillar 242, and a base 244. Of note are the pivotable pedestal base connectors 246 that are generally configured and operated in a manner similar to the pivotable iris carrier connectors 150. In fact, the offset of the two pivotable pedestal base connectors 246 may be the same as that for the pivotable iris carrier connectors 150. As for the iris carrier 54 with its pivotable connectors 150, the pivotable pedestal base connectors 246 hold the pedestal 66 in an upright manner throughout its travel along the pedestal track 68.

The pedestal base 244 is generally minimal and provides a span between the two pivotable connectors 246 in order to support the central pillar 242 and its top 240. In one embodiment, the central pillar 242 may be connected to the base 244 by means of threaded fasteners or the like through holes 248 present in the base 244. Corresponding holes 250 for such threaded fastening are present in the central pillar 242 that match those holes 248 present in the pedestal base 244. Additionally, the pedestal top 240 may have a hole or aperture 254 through which a threaded or other fastener can pass in order to thread into the top of the central pillar 242 in a hole or aperture 252 present there.

In alternative embodiment, a vacuum line may be passed through the pivotable connectors 246 or otherwise to provide a vacuum or suction at the pedestal top 240. Other means by which a vacuum may be provided at the pedestal top 240 are also contemplated in the present invention. With the use of such a vacuum, bottles placed upon the pedestal top 240 may be better held in place in order to better ensure proper sleeving.

Additionally, the pedestal top 240 may be reconfigurable in order to receive the bases of different types of bottles. Should a bottle base have a specific design or configuration for its base, the top of the pedestal 240 may be interchangeably removed and substituted for a pedestal top 240 that better conforms to the bottle bottom.

FIGS. 30 and 31 show additional views of the pedestal base 244.

Figure 32:
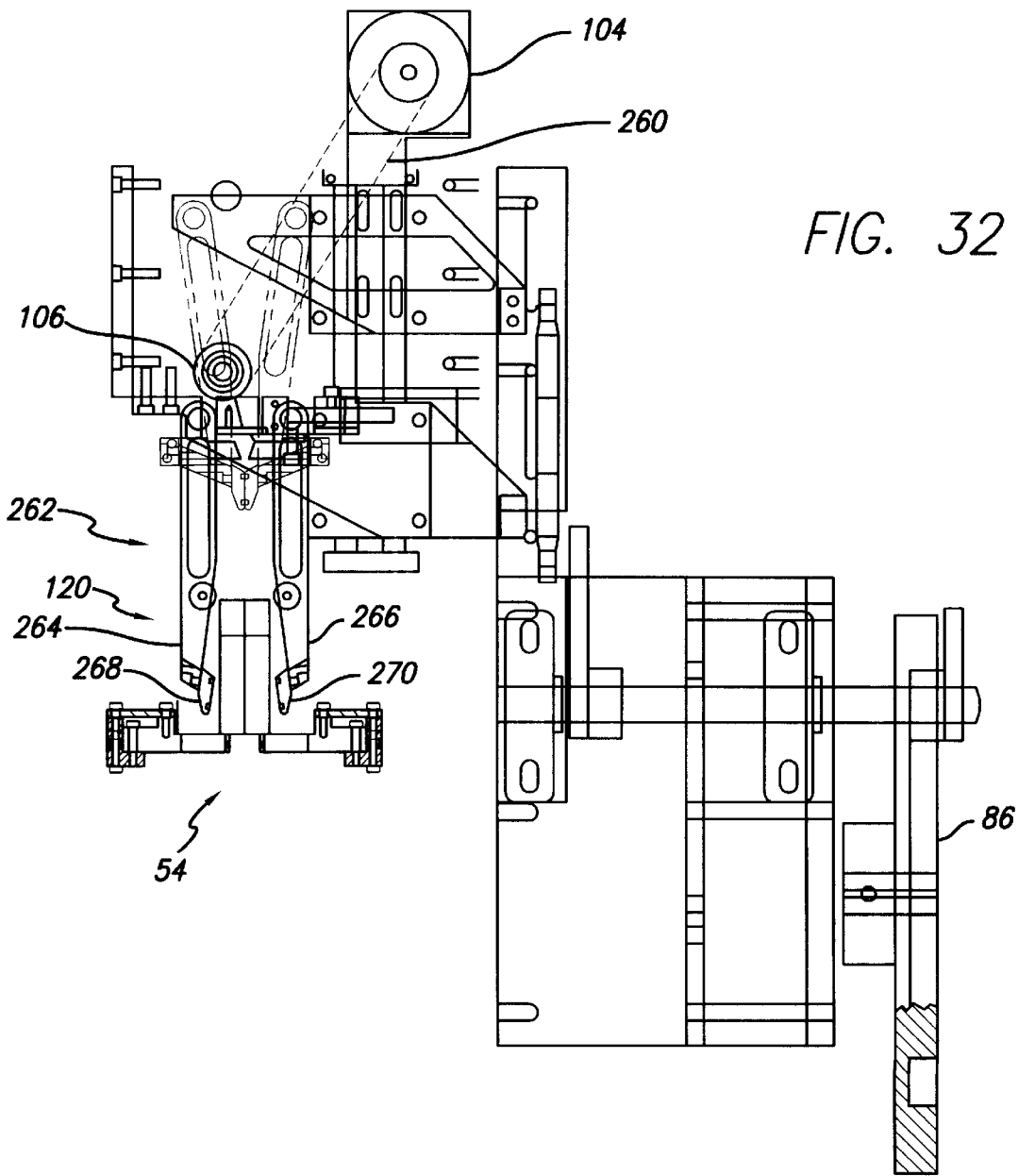
FIG. 32 is a left side elevational view of the label feeder used in the present invention as shown in FIG. 1.

FIG. 32 shows a side view of the label feeder 52. In general, such label feeders are known in the art. U.S. Pat. No. 5,483,783 issued to Lerner et al. on Jan. 16, 1996 describes a label feeder, as do other patents known in the art. Such label feeders provide adequate means by which labels may be delivered to the iris carrier 54 of the present invention.

However, in FIG. 32, one alternative embodiment of the label feeder 52 is shown. A stepper motor 104 drives a belt 260 to control the motion of the nip roller 106 that controls the progress of a web or ribbon of sleeves from the label or sleeve spool or roll 112. Upon passing through the nip roller 106, the terminal sleeve is engaged by a pair of articulating arms 264, 266, that end in pneumatically-operated suction graspers 268, 270. The terminal sleeve passes through an open guillotine or other cutting device disposed between the nip roller 106 and the now-extending terminal end of the label webbing. Upon extending outward a predetermined amount, the stepper motor 104 temporarily stops in place and the articulating arms 264, 266 cause the suction graspers 268, 270 to engage the sleeve and place some slight tension upon the terminal sleeve. The open guillotine then closes to sever the terminal sleeve from the main web or roll. The nip roller 106 holds the sleeve webbing in place during the cutting process.

Figure 33:
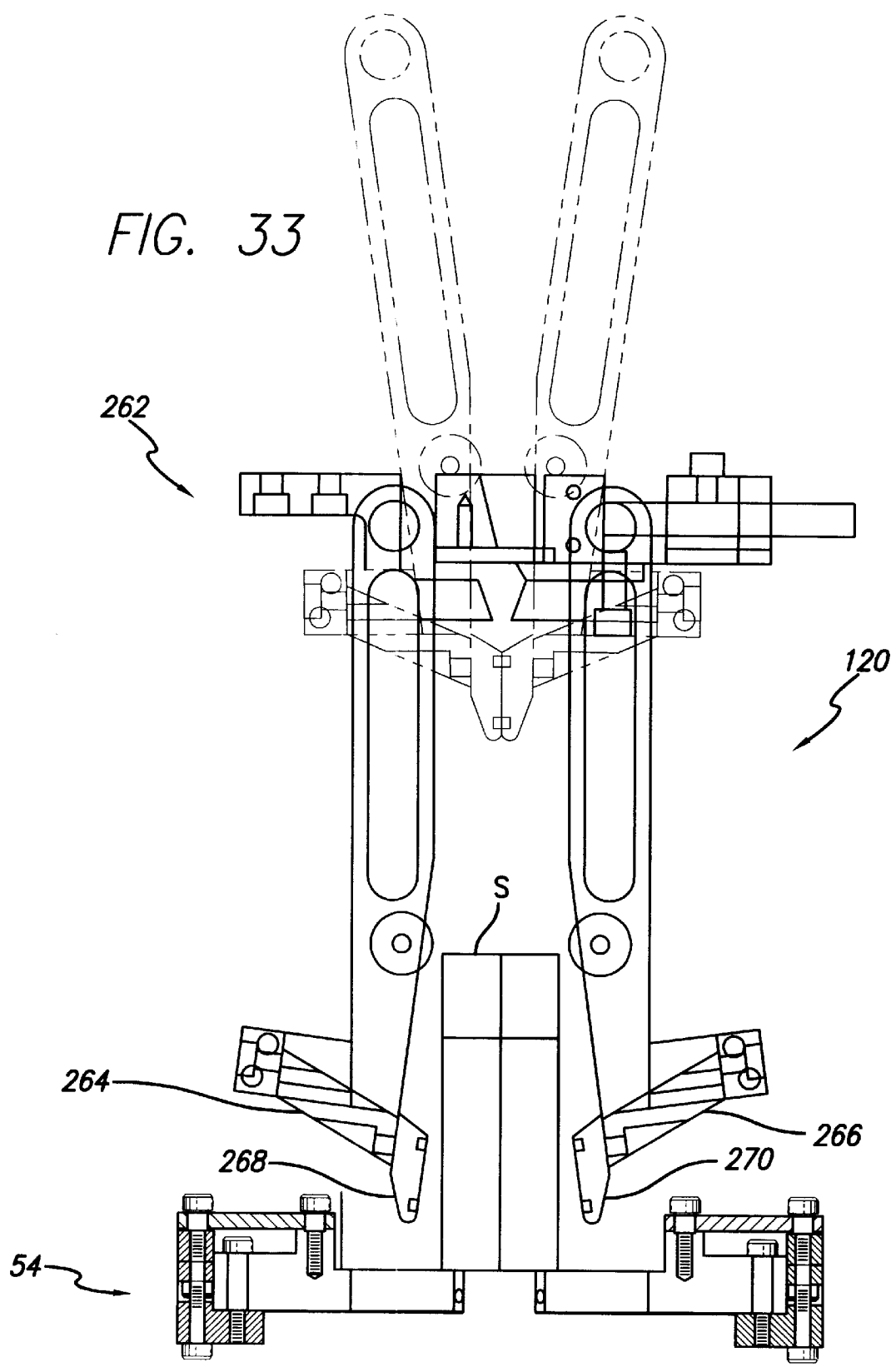
FIG. 33 is a close-up view of the sleeve-transfer apparatus of the label feeder as it descends to place a label sleeve about the finger rods of the iris carrier.

The suction graspers 268, 270 are then articulated outwardly by the articulating arms 264, 266 of the sleeve-feeding mechanism 120 to place the now-free terminal sleeve upon the contracted finger rods 142 extending upwardly from the radial arms 140 of the iris carrier 54. FIG. 34a shows the suction graspers 268, 270 opening a sleeve S. FIG. 33 shows the placement of a sleeve S on the finger rods 142. The stepper motor 104 then advances the continuous web of labels or sleeves through the nip rollers 106 and the now-open gap of the guillotine cutter. The vacuum provided upon the suction graspers 268, 270 ceases so that the sleeve is released upon the iris carrier 54. The articulating arms 264, 266 then retract to grasp (by the suction graspers 268, 270) the next label or sleeve.

Figure 34:
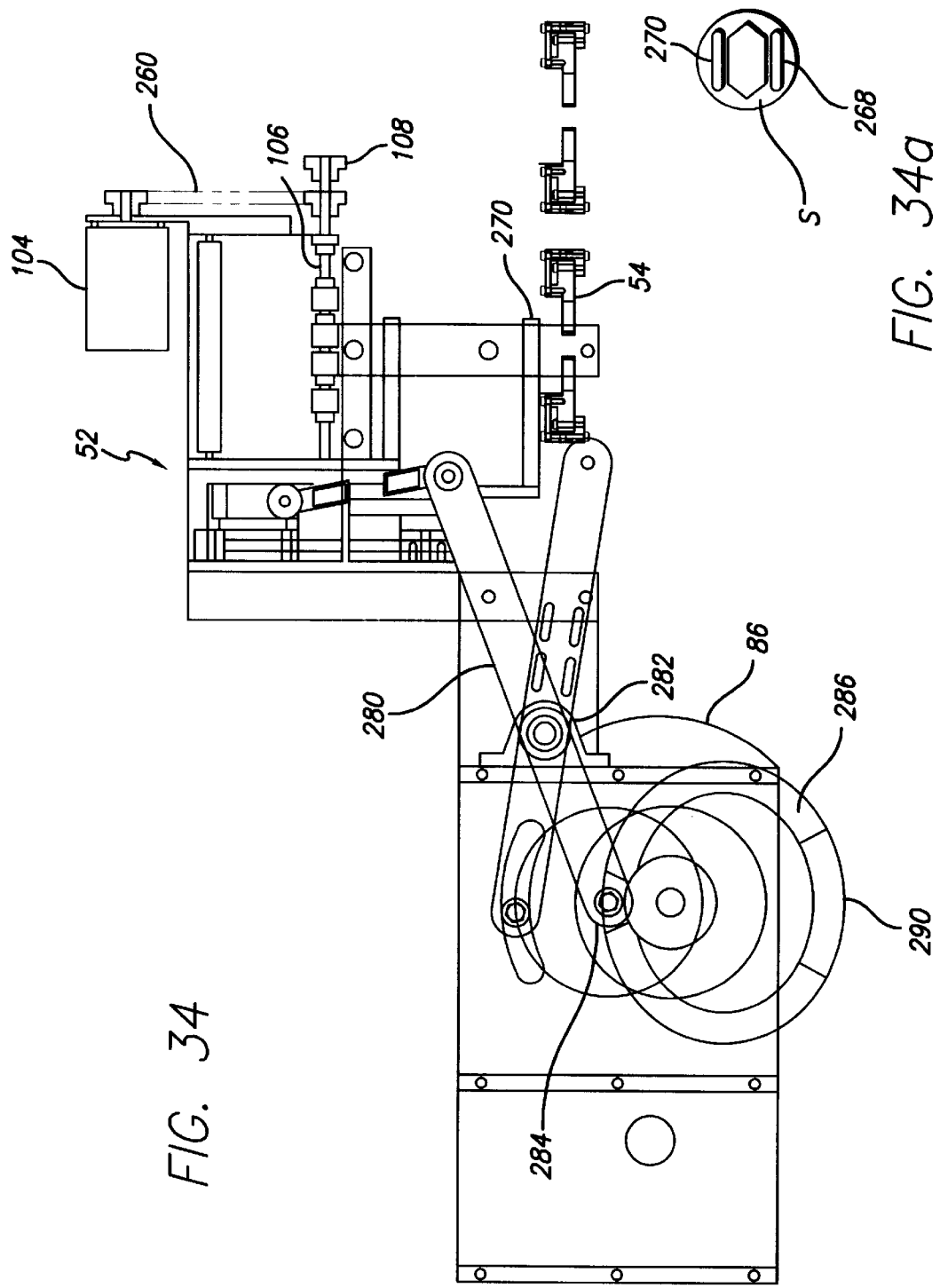
FIG. 34 is a front schematic view of the label feeder shown coupled to the flywheel of the present invention.

As shown in FIG. 34, the label feeder 52 is actuated by a bascale or seesaw bar 280 that is pivotally attached at its center 282 to the labeling machine 50. The far end 284 of the bascale bar 280 is rollably coupled to the flywheel 86 and rides in a groove 286 engraved therein.

The bascale bar groove 286 is generally elliptical in nature extending outward toward the perimeter of the flywheel 86 at one end 290 and traveling toward the center 292 of the flywheel 86 180° opposite of the near-circumferential end 290. As the flywheel 86 turns, the terminal end 284 of the bascale bar 280 is held in a radially fixed position relative to the center point 282. Consequently, the turning of the flywheel 86 causes the terminal end 284 of the bascale bar 280 to oscillate up and down. The opposite terminal end 300 of the bascale bar 280 travels in a path directly opposite of that to the flywheel terminal end 284. That is to say, when the flywheel terminal end 284 of the bascale bar 280 travels upward, the label feeder terminal end 300 of the bascale bar 280 travels downward, and vice versa. Consequently, the timing and actuation of the label feeder 52 can be controlled by sensing or transmitting the oscillations of the label feeder terminal end 300 of the bascale bar 280.

The bascale bar 280 converts the circular motion of the flywheel 86 to linear motion at the label feeder terminal end 300 of the bascale bar 280. The motion of the terminal end 300 of the bascale bar 280 may also serve to mechanically drive the articulating arms 264, 266 and related structures of the label transfer system 262 (FIG. 33). In coordination with the operation of the bascale bar 280, the stepper motor 104 and the pneumatic operation of the suction graspers 268, 270 are operated in order to properly feed the labels from the continuous label web through the cutting process and onto the iris carriers 54.

Figure 35:
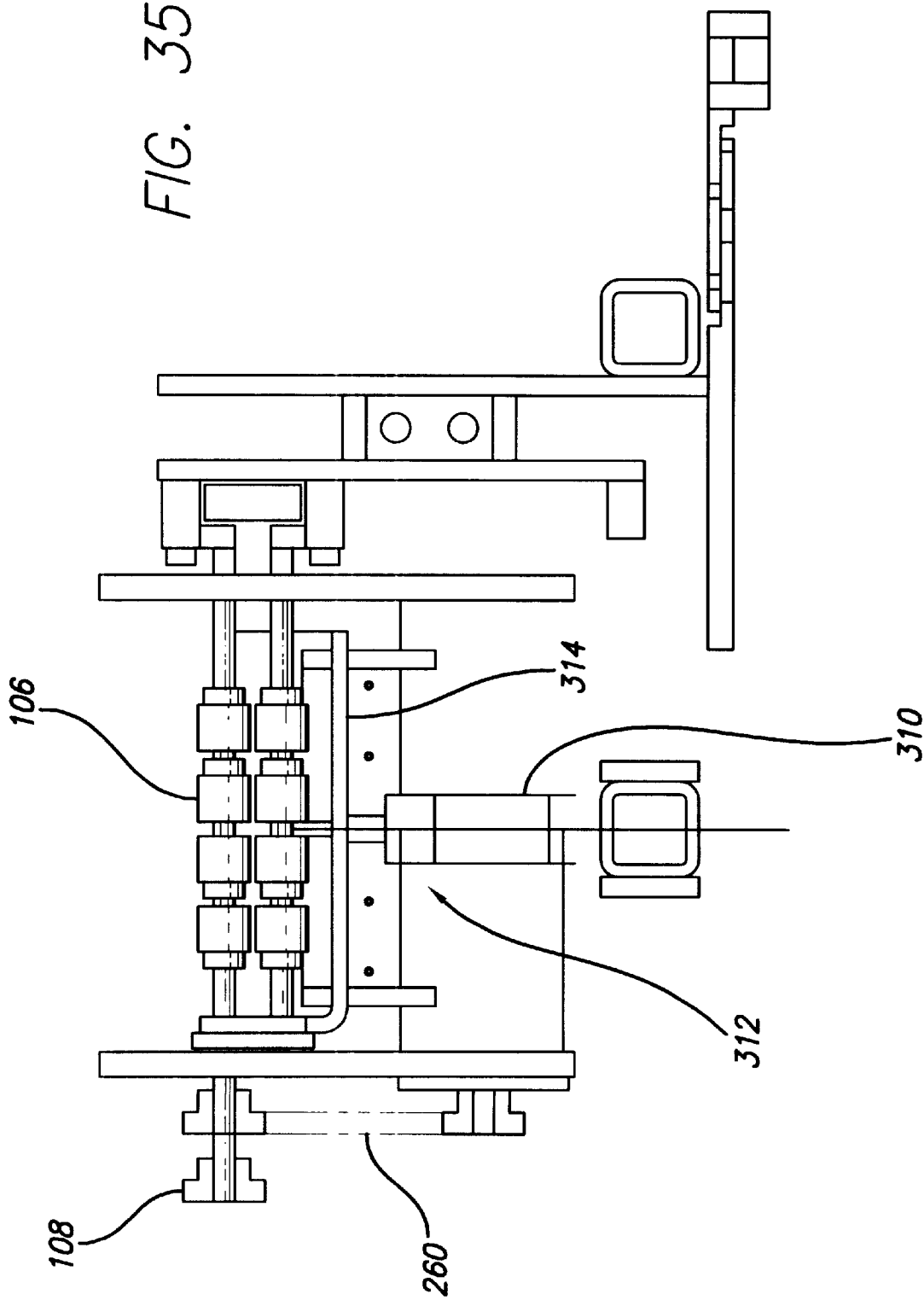
FIG. 35 is a schematic plan view of the nip rollers used to advance the sleeve labels in the present invention.

FIG. 35 shows a top view of the nip roller 106, and to a certain extent, the guillotine device 312. The piston 310 for the guillotine device 312 is partially indicated in FIG. 35. The guillotine blade 314 is located below the nip roller 106 in order to receive the label sleeves.

Figure 36:
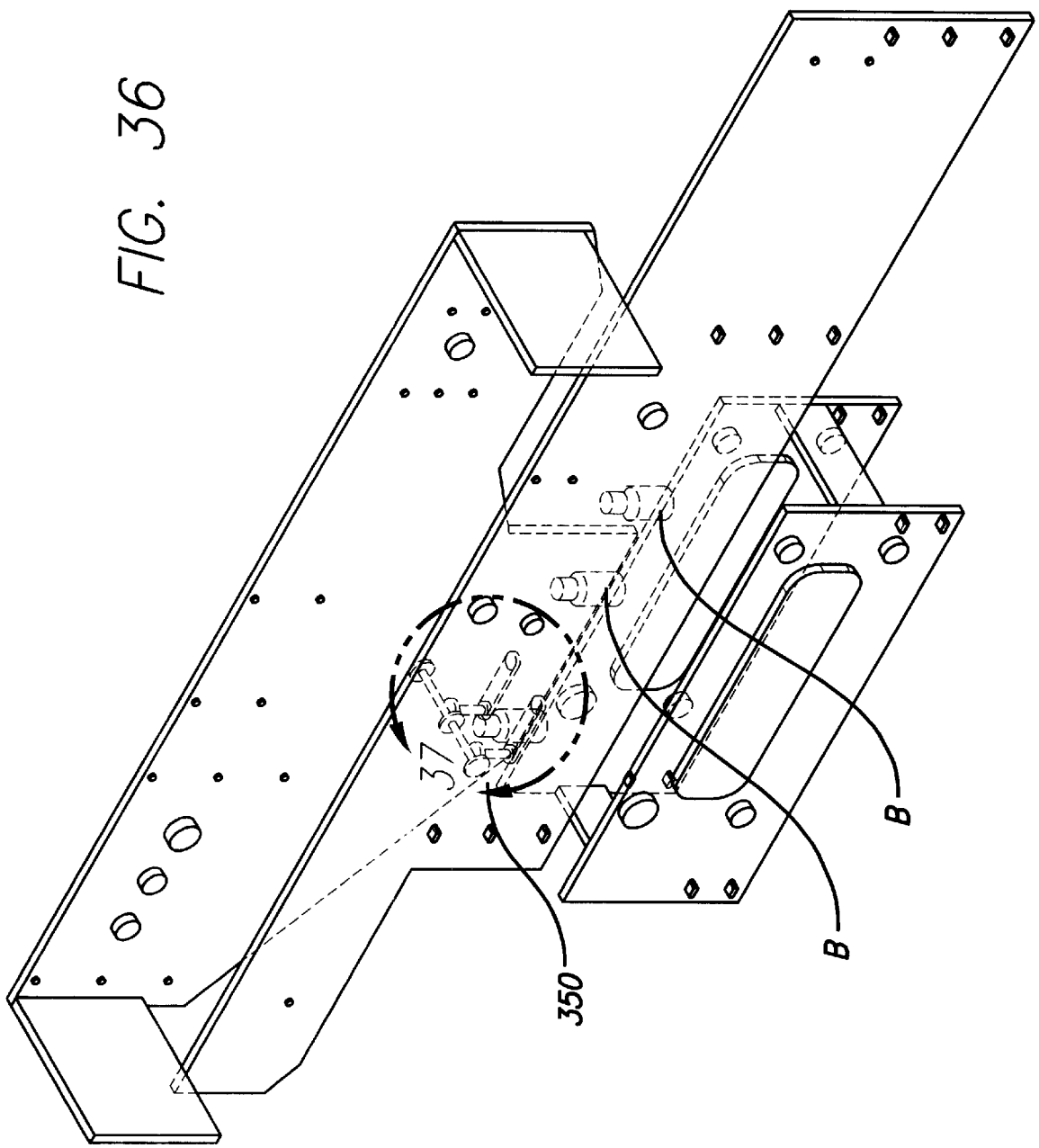
FIG. 36 is a partial upper right side perspective schematic view of the labeling machine of the present invention showing the container stabilizer.

FIG. 36 shows a perspective view of a container stabilizer 350 that may be used in conjunction with the labeling machine 50 of the present invention. As shown in FIG. 36, the container stabilizer 350 is generally present at the end of the ensleeving portion of the process. The bottles B approach the container stabilizer 350 while being supported by pedestals 66 and circumscribed by the iris carriers 54. FIG. 36 shows schematically the presence and operation of the container stabilizer 350 with most of the other components of the labeling machine 50 removed for descriptive purposes.

As the bottles B approach the container stabilizer 350, they are supported by the associated pedestal 66 and circumscribed by the iris carrier 54. The bottle B may be safely engaged by the container stabilizer 350 once the iris carrier 54 has descended below the container stabilizer 350. The container stabilizer 350 may then engage a top portion of the bottle B, aiding the labeling process.

Figure 37:
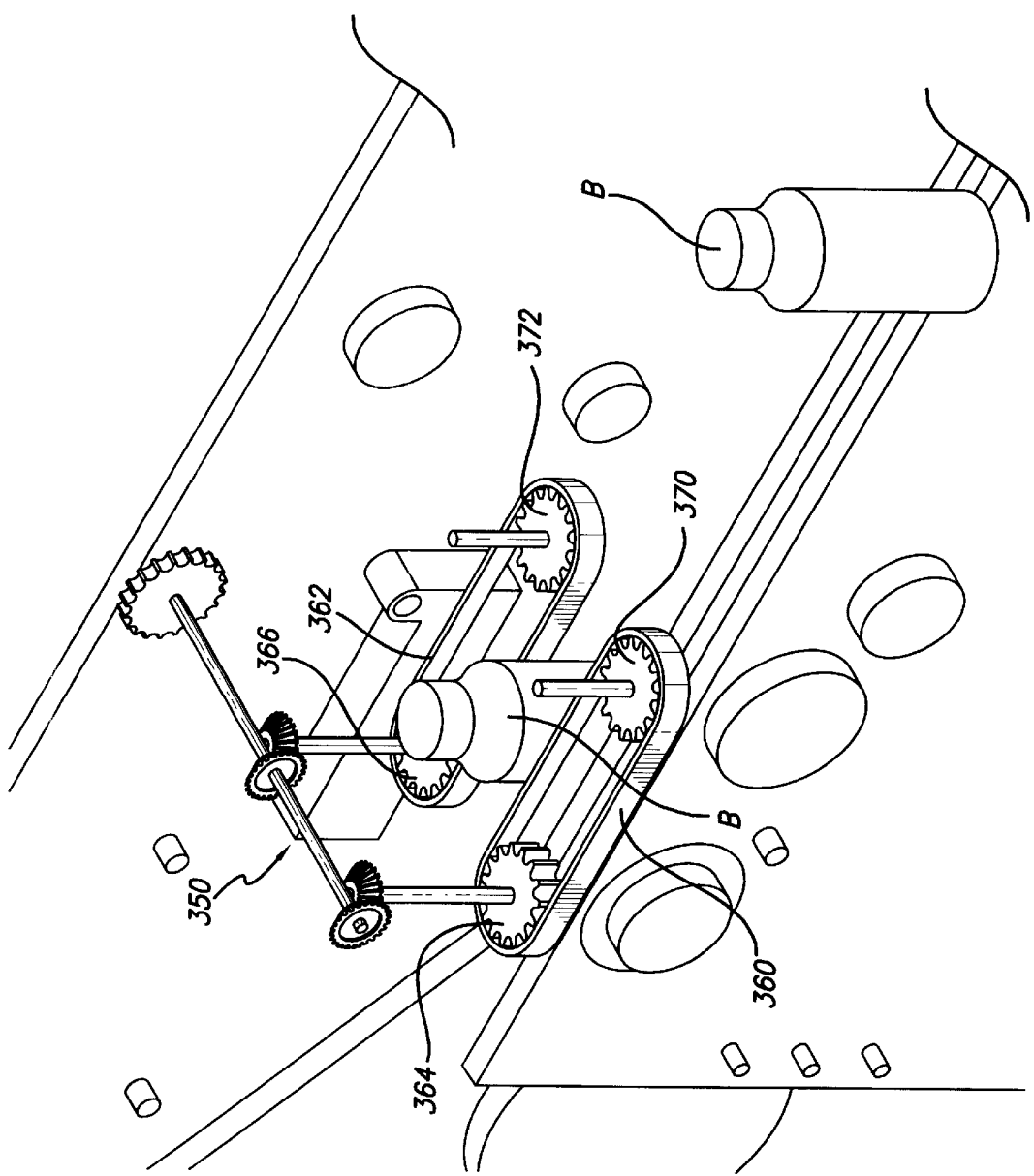
FIG. 37 is a closer perspective view of the stabilizer of FIG. 36 encircled by circle 37.

FIG. 37 shows the container stabilizer 350 enlarged as indicated by circle 37 in FIG. 36. The container stabilizer 350 generally has a left belt 360 oppositely opposed to a right belt 362. The overall length of the belts 360, 362 is generally as short as possible but long enough so that the iris carrier 54 may disengage the sleeve, leaving it about the bottle B. In some embodiments, the belts 360, 362 slightly compress the bottle B between them, the belts 360, 362 increasing in tension to accommodate the snug fit as the bottle B travels through the container stabilizer 350.

The belts 360, 362 may be driven by respective wheels 364, 366. The driving wheels 364, 366 turn the belts 360, 362 about themselves and tension rollers 370, 372 spaced apart from the driving wheels 364, 366.

The driving wheels 364, 366 may be driven by shafts coupled to the ultimate mechanical or other power supply for the labeling machine 50. Gearing mechanisms such as those known in the art are able to transmit such mechanical power in a known fashion.

In order to maintain synchronization with the iris carrier system 60 and the pedestal system 64, the container stabilizer 350 and its left and right belts 360, 362 are synchronized to travel at the same horizontal rate as the iris carriers 54 and the pedestal 66. This ensures that the bottles B are subject to the same horizontal velocity at their top (via the container stabilizer 350) and at their bottom (via the pedestal 66).

As the bottles B approach the container stabilizer 350, the iris carrier 54 with its label descends about the bottle B. The container stabilizer 350 may be positioned such that as the iris carrier 54 reaches the end of its downward travel, the stabilizer belts 360, 362 B engage and compress the label at its top to the bottle B. The label is then fixed in position upon the bottle B by the slight compression and snug fit experienced between the bottle B and the container stabilizer 350.

As the label is held in place, the iris carrier 54 may continue its downward travel and proceed to disengage the label, leaving it behind the bottle B. The finger rods 142 may contract slightly, possibly coming into only light contact with the bottle B. The finger rods 142 may then slide out from within the label as the iris carrier 54 descends towards the base of the bottle B. When the iris carrier 54 fully releases the label, the tension applied to the label is released and it may snugly encircle the bottle B. The label may then remain snugly attached to the bottle B or the bottle B with its label may be subject to a shrinking process as may be achieved by the application of heat. The bottle B then exits the container stabilizer 350 and proceeds onwardly to the output conveyor 76.

The container stabilizer 350 generally cannot support the bottle B as it makes the transition from the pedestal 66 to the output conveyor 76 as it would interfere with the upward motion and return of the iris carriers 54 to the label feeder 52. However, the "well" provided by the iris carrier track 56 provides ample space within which the container stabilizer 350 may operate.

In some embodiments of the iris carrier 54, extensions (not shown) may project below the plain of the iris carrier 54 in order to better engage the bottle B as the iris carrier 54 initially descends about it. The extensions may flare outwardly so as to provide a greater area into which the top of the bottle B may fit and be guided into the iris carrier 54.

Figure 38:
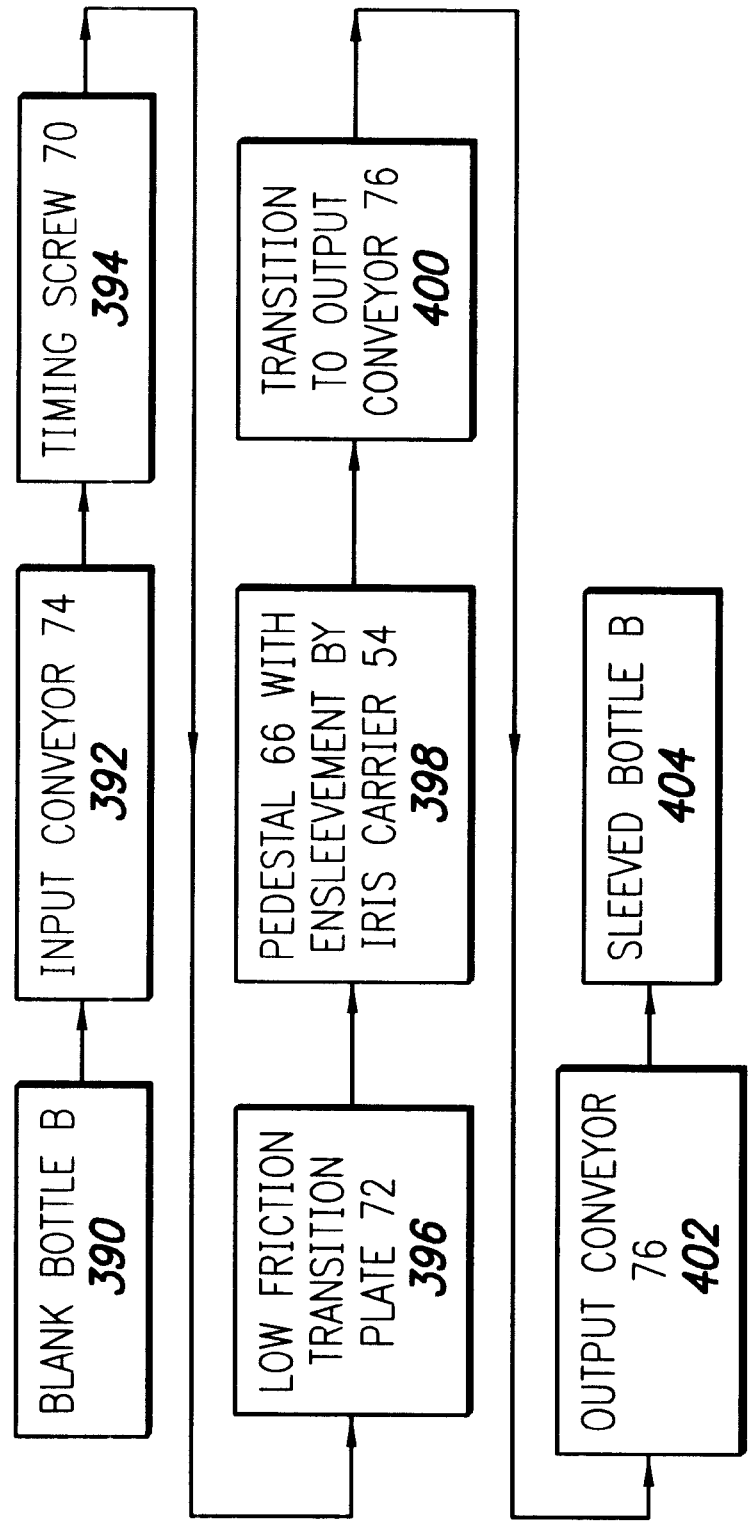
FIG. 38 is a flow chart showing the steps taken to transport a blank bottle B.

FIG. 38 shows the steps taken in order to ensleeve a single bottle B. The process is basically the same for all such bottles traveling through the labeling machine 50 of the present invention.

A blank bottle B 390 is transported by the input conveyor 74 at step 392. The input conveyor 74 then transfers control of the bottle B to a timing screw 70 394. In turn, the timing screw 70 propels the bottle B over the low friction transition plate 72 396. The bottle B is then transferred to the pedestal 66 and is ensleeved by the iris carrier 54 398. As mentioned above, the timing screw 70 may help to propel the bottle B onto the pedestal 66. However, as an alternative embodiment indicated above, the iris carrier 54 may have downwardly projecting extensions that serve to aid in the capture and transport of the bottle B, particularly with respect to the transition from the low friction transition plate 72 to the pedestal 66.

After the bottle B has been ensleeved, the pedestal 66 carries the bottle B to the output conveyor 76, which may also have a low friction transition plate similar to the one used to transport the bottle B onto the pedestal 66. As shown in FIG. 38, the transition from the pedestal 66 to the output conveyor 76 is indicated by reference 400. The bottle B is then transported by the output conveyor 76 and away from the labeling machine 50 402. The sleeved bottle B is then ready for filling or boxing, depending upon whether the bottle B is empty or full and depending upon the position of the labeling machine 50 in the manufacturing line. This final step is indicated by reference 404.

Figure 39:
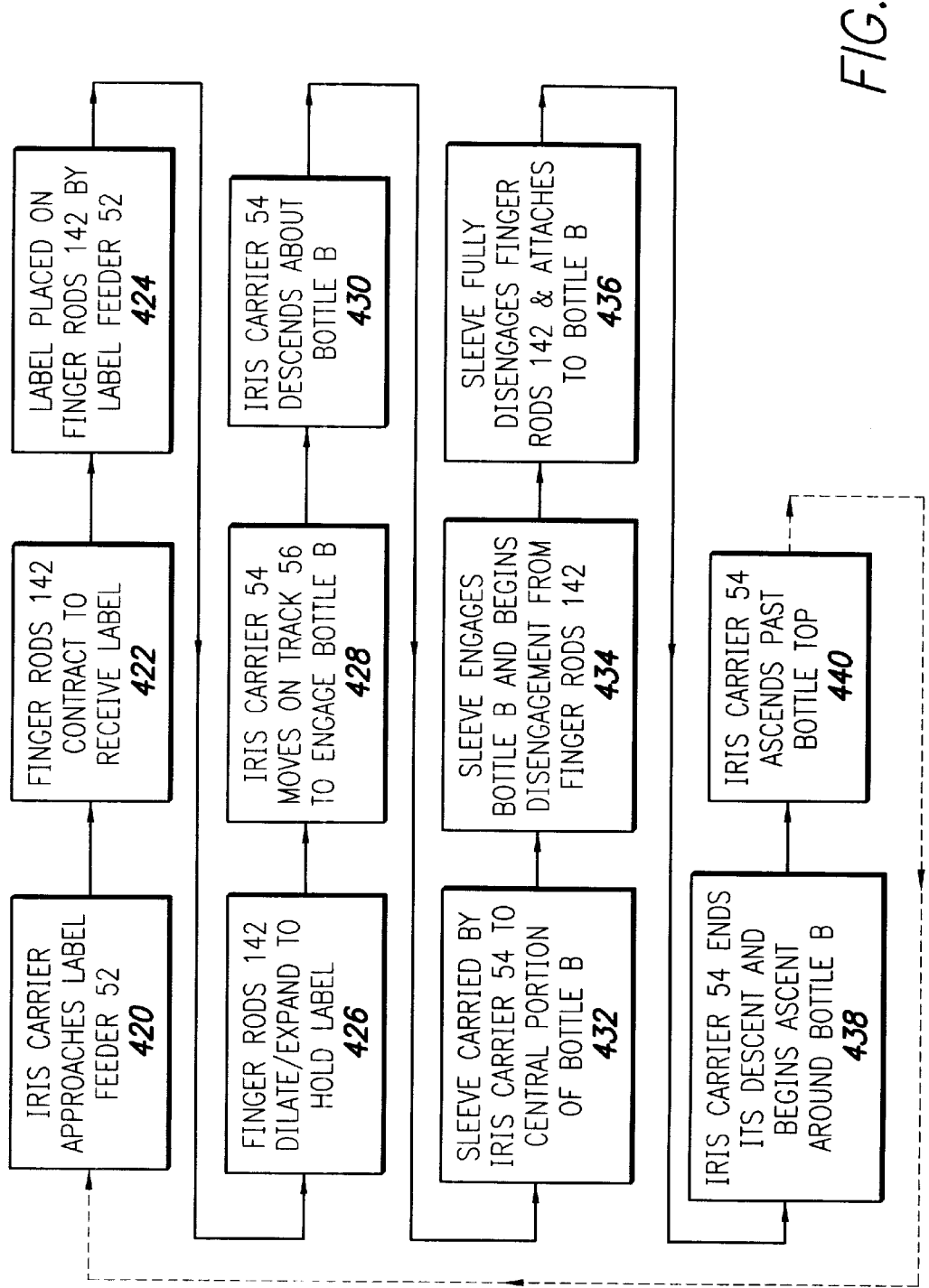
FIG. 39 is a flow chart showing the steps taken to deliver a label sleeve to a blank bottle B.

FIG. 39 provides an indication of the steps taken by the iris carrier 54 as it receives and delivers the sleeve or label and subsequently ensleeves the bottle B. The iris carrier 54 initially approaches the label feeder 52 at an initial startup or after delivering a as prior sleeve to as bottle B 420. In so approaching the label feeder 52, the finger rods 142 of the iris carrier 54 contract to receive a label 422. The label is then placed upon the finger rods 142 by the label feeder 52 424. Once the label is placed upon the finger rods 142, they dilate, or expand, to slightly tension and hold the label in place upon the iris carrier 54 426. The iris carrier 54 now holds a label in a secure disposition in order to transport the label to a bottle B for ensleeving. The iris carrier 54 moves on the iris carrier track 56 in order to so engage the bottle B 428. After initially engaging the bottle B, the iris carrier 54 descends about the bottle B 430. The sleeve is then carried forwardly and downwardly by the iris carrier 54 to a central portion of the bottle B 432.

In some embodiments, once the sleeve has been carried to the central portion of the bottle B by the iris carrier 54, the top margin of the label may be engaged by the belts 360, 362 of the container stabilizer 350. This serves to hold the label in place upon the bottle B while the iris carrier 54 continues to descend and disengage from the label. As the sleeve engages the bottle B, it begins to disengage from the finger rods 142 of the iris carrier 54 434. As the iris carrier 54 continues to descend, the finger rods 142 fully disengage the sleeve, attaching it to bottle B 436. Once the finger rods 142 have disengaged the sleeve, the iris carrier 54 may begin to ascend upwardly about the bottle B 438. The iris carrier 54 continues to ascend until it disengages the bottle B by traveling past its top 440. As the iris carrier 54 ascends past the top of the bottle B, it may serve to push or propel the bottle B from its pedestal 66 and on to the output conveyor 76 on a low friction transition plate associated with the output conveyor 76.

The foregoing invention provides in-line means by which bottles may be sleeved at their central portions in a continuous manner. Pneumatic, mechanical, and electronic coordination of the system set forth herein is believed to be within the knowledge and skill currently present in the art. Consequently, by the disclosure of the foregoing elements of the present invention and the indication that they operate synchronously with one another, the present invention is believed to have been made sufficiently clear for those having knowledge of the related art.

While the present invention has been described with regards to particular embodiments, it is recognized that additional variations of the present invention may be devised without departing from the inventive concept. Among such alternative embodiments are the use of one or more electric eyes associated with the labeling machine 50 of the present invention to indicate to the label feeder 52 when a bottle is missing in sequence so that an iris carrier 54 is not ensleeved by the label transfer system 262 (FIG. 33). Additionally, and as shown in FIG. 1, a balance slot 320 present in the flywheel 86 may balance the weight missing from the flywheel 86 removed to create the bascale bar groove 286.

What is claimed is:

1. A sleeve application machine for labeling containers such as bottles, comprising:

a sleeve carrier, said sleeve carrier defining a bottle-receiving aperture circumscribed by a controllable label holder;

a sleeve carrier transport system, said sleeve carrier transport system transporting said sleeve carrier and causing said sleeve carrier to circumscribe a bottle so that said bottle may be labeled by said sleeve carrier, said bottle passing through said aperture during a sleeving operation;

a first endless track pivotably coupled to said sleeve carrier on a first side of said sleeve carrier at a first position on said sleeve carrier; and a second endless track pivotably coupled to said sleeve carrier on a second side of said sleeve carrier opposite said first side at a second position on said sleeve carrier, said second endless track parallel to said first endless track and offset from said first endless track by a distance equal to an offset present in said sleeve carrier between said first position and said second position so that said sleeve carrier transport system transports said sleeve carrier and keeps said sleeve carrier in a horizontal position throughout a complete cycle of said sleeve carrier transport system; and a pedestal, moveable horizontally and vertically, said pedestal receiving and supporting said bottle for labeling by said sleeve carrier, said pedestal maintaining an elevation of said bottle at a constant level when engaged with said bottle; whereby said bottle may pass into and out of the sleeve application machine in a straight-line fashion, said bottle maintaining a substantially constant elevation during the sleeving operation.

2. A sleeve application machine for labeling containers such as bottles, comprising:

a carrier, said carrier defining a bottle-receiving aperture circumscribed by a controllable label holder, said carrier having a carrier base with first and second offset pivoting connections, a link ring coupled to said carrier base, a radial arm coupled to said carrier base and said link ring, and a finger rod coupled to said radial arm so that pivoting said link ring with respect to said base pivots said radial arm upon said carrier base and swings said finger rod towards a center of said bottle-receiving aperture;

a carrier transport system, said carrier transport system transporting said carrier and causing said carrier to circumscribe a bottle so that said bottle may be labeled or sleeved by said carrier, said bottle passing through said aperture during a sleeving operation, said carrier transport system having a first endless track pivotably coupled to said carrier at said first pivoting connection on a first side of said carrier at a first position on said carrier and a second endless track pivotably coupled to said carrier at said second pivoting connection on a second side of said carrier opposite said first side at a second position on said carrier, said second endless track parallel to said first endless track and offset from said first endless track by a distance equal to an offset present in said carrier between said first carrier position and said second carrier position so that said carrier transport system transports said carrier and keeps said carrier horizontal throughout a complete cycle of said carrier transport system;

a pedestal, said pedestal receiving and supporting said bottle for labeling by said carrier, said pedestal maintaining an elevation of said bottle at a constant level, said pedestal having a pedestal base having first and second offset pivoting pedestal connections, a pillar coupled to said pedestal base, and a bottle-engaging top coupled to said pillar so that said pedestal engages a bottom of said bottle and supports said bottle as said carrier labels said bottle;

a pedestal transport system, said pedestal transport system transporting said pedestal and causing said pedestal to movably support said bottle so that said bottle may be labeled by said carrier, said pedestal transport system moving synchronously with said carrier transport system so that horizontal motion of said pedestal matches and is aligned with horizontal motion of said carrier, said pedestal transport system having a first endless pedestal track pivotably coupled to said pedestal at said first pivoting pedestal connection on a first side of said pedestal at a first position on said pedestal and a second endless pedestal track pivotably coupled to said pedestal at said second pivoting pedestal connection on a second side of said pedestal opposite said first side at a second position on said pedestal, said second endless pedestal track parallel to said first endless pedestal track and offset from said first endless pedestal track by a distance equal to an offset present in said pedestal between said first pedestal position and said second pedestal position so that said pedestal transport system transports said pedestal and keeps said pedestal vertical throughout a complete cycle of said pedestal transport system;

a container stabilizer disposed above said pedestal transport system, said bottle stabilized by said container stabilizer as said bottle travels upon said pedestal and is labeled by said carrier, said container stabilizer having a first endless belt disposed on a first side of said bottle and a second endless belt disposed on a second side of said bottle, said second endless belt oppositely opposed said first endless belt so that said bottle is trapped between said first and second endless belts, said bottle stabilized by entrapment between said first and second endless belts;

a label feeder, said label feeder proximate said carrier transport system, said label feeder feeding labels to said carrier as said carrier passes by said label feeder, said label feeder having a guillotine cutter, said guillotine cutter cutting an individual label from a ribbon of labels, said label then fed to said carrier by said label feeder;

a timing screw acting as a single bottle feed system, said timing screw adjacent said pedestal when said pedestal receives said bottle, said timing screw synchronously feeding said bottle to said pedestal; and an exit conveyor, said exit conveyor receiving said bottle from said pedestal, said exit conveyor transporting said bottle away from said pedestal; whereby said bottle may pass into and out of the sleeve application machine in a straight-line fashion, said bottle maintaining a constant elevation during the sleeving operation.

3. A sleeve application machine for labeling containers such as bottles, comprising:

label carrying means for carrying labels, said label-carrying means defining bottle-receiving aperture means for receiving a bottle, said bottle-receiving aperture means circumscribed by a controllable label-holding means for controllably holding a label to be applied to said bottle, said label-carrying means having label-carrying base means with first and second offset pivoting connection means, link ring means coupled to said label-carrying base means, radial arm means coupled to said label-carrying base means and said link ring means, and finger rod means coupled to said radial arm means so that pivoting said link ring means with respect to said label-carrying base means pivots said radial arm means upon said label-carrying base means and swings said finger rod means towards a center of said bottle-receiving aperture means;

label-carrying means transport means for transporting said label-carrying means and causing said label-carrying means to circumscribe a bottle so that said bottle may be labeled by said label carrying means, said bottle passing through said aperture means during a sleeving operation, said label-carrying means transport means having first endless track means pivotably coupled to said label-carrying means at said first pivoting connection means on a first side of said label-carrying means at a first position on said label-carrying means and second endless track means pivotably coupled to said label-carrying means at said second pivoting connection means on a second side of said label-carrying means opposite said first side at a second position on said label-carrying means, said second endless track means parallel to said first endless track means and offset from said first endless track means by a distance equal to an offset present in said label-carrying means between said first label-carrying means position and said second label carrying means position so that said label-carrying means transport means transports said label-carrying means and keeps said label-carrying means horizontal throughout a complete cycle of said label-carrying means transport means;

pedestal means for receiving and supporting said bottle for labeling by said label-carrying means, said pedestal means maintaining an elevation of said bottle at a constant level, said pedestal means having a pedestal base means having first and second offset pivoting pedestal connection means, pillar means coupled to said pedestal base means, and bottle-engaging top means coupled to said pillar means so that said pedestal means engages a bottom of said bottle and supports said bottle as said label-carrying means labels said bottle;

pedestal means transport means for transporting said pedestal means and causing said pedestal means to movably support said bottle so that said bottle may be labeled by said label-carrying means, said pedestal means transport means moving synchronously with said label-carrying means transport means so that horizontal motion of said pedestal means matches and is aligned with horizontal motion of said label-carrying means, said pedestal means transport means having a first endless pedestal track means pivotably coupled to said pedestal means at said first pivoting pedestal connection means on a first side of said pedestal means at a first position on said pedestal means and a second endless pedestal track means pivotably coupled to said pedestal means at said second pivoting pedestal connection means on a second side of said pedestal means opposite said first side at a second position on said pedestal means, said second endless pedestal track means parallel to said first endless pedestal track means and offset from said first endless pedestal track means by a distance equal to an offset present in said pedestal means between said first pedestal means position and said second pedestal means position so that said pedestal means transport means transports said pedestal means and keeps said pedestal means vertical throughout a complete cycle of said pedestal means transport means;

container stabilizer means for stabilizing said bottle, said container stabilizer means disposed above said pedestal means transport means, said bottle stabilized by said container stabilizer means as said bottle travels upon said pedestal means and is labeled by said label carrying means, said container stabilizer means having first endless belt means disposed on a first side of said bottle and second endless belt means disposed on a second side of said bottle, said second endless belt means oppositely opposed said first endless belt means so that said bottle is trapped between said first and second endless belt means, said bottle stabilized by entrapment between said first and second endless belt means;

label feeder means for feeding labels to said label-carrying means as said label-carrying means passes by said label feeder means, said label feeder means proximate said label-carrying means transport means, said label feeder means having guillotine cutter means, said guillotine cutter means for cutting an individual label from a ribbon of labels, said label fed to said label-carrying means by said label feeder means;

timing screw means for synchronously feeding said bottle to said pedestal means, said timing screw means adjacent said pedestal means when said pedestal means receives said bottle, said timing screw means acting as a single bottle feed system; and conveyor means for transporting said bottle away from said pedestal means, said exit conveyor means receiving said bottle from said pedestal means; whereby said bottle may pass into and out of the sleeve application machine in a straight-line fashion, said bottle maintaining a constant elevation during the sleeving operation.

* * * * *